United States Patent
Wigren

(10) Patent No.: US 8,175,061 B2
(45) Date of Patent: May 8, 2012

(54) PATH LOSS POLYGON POSITIONING

(75) Inventor: Torbjörn Wigren, Uppsala (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 837 days.

(21) Appl. No.: 12/162,241

(22) PCT Filed: Jan. 27, 2006

(86) PCT No.: PCT/SE2006/000132
§ 371 (c)(1),
(2), (4) Date: Jul. 25, 2008

(87) PCT Pub. No.: WO2007/086784
PCT Pub. Date: Aug. 2, 2007

(65) Prior Publication Data
US 2009/0017831 A1    Jan. 15, 2009

(51) Int. Cl.
*H04W 4/00*     (2009.01)
*H04L 12/42*    (2006.01)
*H04L 12/403*   (2006.01)

(52) U.S. Cl. .................... 370/332; 455/456.1
(58) Field of Classification Search .......... 370/331, 370/332, 335; 455/446, 456.1–456.6
See application file for complete search history.

(56) References Cited

U.S. PATENT DOCUMENTS

| | | | | |
|---|---|---|---|---|
| 6,542,716 B1* | 4/2003 | Dent et al. | ............ | 455/13.1 |
| 2003/0146871 A1* | 8/2003 | Karr et al. | ............ | 342/457 |
| 2004/0067759 A1* | 4/2004 | Spirito et al. | ............ | 455/456.1 |
| 2009/0117907 A1* | 5/2009 | Wigren | ............ | 455/440 |
| 2010/0087198 A1* | 4/2010 | Wigren | ............ | 455/446 |

* cited by examiner

*Primary Examiner* — Chi Pham
*Assistant Examiner* — Farah Faroul
(74) *Attorney, Agent, or Firm* — Roger S. Burleigh

(57) ABSTRACT

The present invention introduces methods and devices for provision of position determination assisting data as well as methods, devices and systems for performing position determinations based on this assisting data. The position determination assisting data comprises area definitions, each of which being related at least to a respective quantized path loss measurement index vector. Preferably, the vector is also dependent on relative radio conditions between different cells and/or transmission mode.

44 Claims, 12 Drawing Sheets

| ID1, qPL1 |
| ID2, qPL2 |
| ID3, qPL3 |
| ID4, qPL4 |
| ID5, qPL5 |

| | 8 | 7 | 6 | 5 | 4 3 2 1 | |
|---|---|---|---|---|---|---|
| | 0 | 1 | 0 | 1 | NO. OF POINTS | OCTET 1 |
| | S1 | | | | | OCTET 2 |
| | | | | | | OCTET 3 |
| | | | | | | OCTET 4 |
| | | | | | | OCTET 5 |
| | | | | | | OCTET 6 |
| | | | | | | OCTET 7 |

•
•
•

| | Sn | | | | | OCTET 6n-4 |
|---|---|---|---|---|---|---|
| | | | | | | OCTET 6n-3 |
| | | | | | | OCTET 6n-2 |
| | | | | | | OCTET 6n-1 |
| | | | | | | OCTET 6n |
| | | | | | | OCTET 6n+1 |

Fig. 6

PATH LOSS POLYGON POSITIONING

TECHNICAL FIELD

The present invention relates in general to methods and systems for position determination of mobile terminals in a cellular communications network, and in particular to such position determination involving path loss and signal strength measurements.

BACKGROUND

All cellular communications systems are divided into cells, where User Equipments (UEs) are served by one, or when in soft(er) handover, several base stations. Each base station may serve UEs in more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity corresponding to the particular geographical area.

An example of positioning within a Wideband Code Division Multiple Access (WCDMA) cellular system operates briefly as follows, assuming that the positioning operates over the Radio Access Network Application Part (RANAP) interface. The procedures are however similar for e.g. the Global System for Mobile communications (GSM) and Code Division Multiple Access 2000 (CDMA 2000).

A message requesting a location estimate is received in the Serving Radio Network Controller (SRNC) over the RANAP interface. The quality of service parameters of the message is assumed to be such that the Radio Network Controller (RNC) selects the cell identity positioning method. The SRNC determines the serving cell identity of the UE to be positioned and retrieves a pre-stored polygon that represents the extension of the serving cell. The SRNC sends the resulting cell polygon back to the core network over the RANAP interface, using a cell polygon format in a location report message.

It should, however, be noted that due to the complexity of the radio propagation, the cell polygon format is only an approximation of the extension of the true cell. The selection of the polygon format is dictated by the need to have a reasonably flexible geographical representation format, taking, e.g., computation complexities and reporting bandwidths into account.

Since the polygon format approximates the cell extension, the polygon is normally pre-determined in a cell-planning tool to represent the cell extension with a certain confidence. The confidence is intended to represent the probability that the UE is located within the polygon, conditioned on the fact that it is connected to the cell that is represented by the cell polygon. The underlying off-line calculation of the cell polygon can e.g. be based on coverage simulations of varying levels of sophistication. However, the end result is normally not very reliable when the confidence of the calculated cell extension is considered.

The accuracy of the cell identity positioning method is mainly limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has lead to an interest for the development of Enhanced cell identity (E-cell ID) positioning methods that aim at enhancing the accuracy of the basic cell identity method at the same time as the advantages of the method are retained.

One principle for E-cell ID positioning aims at combining the cell extension model with a distance measure. One possibility towards this end is Round Trip Time (RTT) measurements. In the RTT measurement principle, the travel time of radio waves from the Radio Base Station (RBS) to the UE and back is measured. The RTT method alone defines a circle around the RBS. By combining this information with the cell polygon, left and right angles of the circle can be computed.

Another idea for enhanced cell identity positioning has been to use pre-calculated maps of the regions where the UE is in soft(er) handover with one or several cells. Such areas are significantly smaller than the whole cell opening up for a better accuracy of the determined position. Normally these maps are pre-calculated in the planning tool, exactly as the ordinary cell polygons.

Measurements of the path loss using measurements of the signal strength in the UE with respect to specific radio base stations (RBS) constitute another alternative. However, these measurements suffer from shadow fading effects of several dBs, which reduces accuracy when used for positioning purposes. Assuming an 8 dB fading effect the accuracy is limited to about half the distance corresponding to the path loss measurement.

In some situations high-precision positioning is required. In the present disclosure, "high-precision positioning methods" are defined to denote positioning methods that have a potential to meet the North-American E-911 emergency positioning requirements. Methods that meet these requirements are capable of obtaining positioning accuracies of:
 either (terminal based) 50 meters (67%) and 150 m (95%),
 or (network based) 100 meters (67%) and 300 m (95%).

Assisted Global Positioning System (A-GPS) positioning is an enhancement of the Global Positioning System (GPS). GPS reference receivers attached to e.g. a cellular communication system collect assistance data that, when transmitted to GPS receivers in terminals connected to the cellular communication system, enhance the performance of the GPS terminal receivers. Typically, A-GPS accuracy can become as good as 10 meters. Additional assistance data is collected from the cellular communication system directly, typically to obtain a rough initial estimate of the position of the terminal together with a corresponding uncertainty of the initial estimate. This position is often given by a cell identity positioning step.

The Uplink Time Difference Of Arrival (UTDOA) positioning method is based on time of arrival measurements performed in several RBSs of transmissions from the UEs. The signal strengths are higher than in A-GPS, something that enhances the ability to perform positioning indoors. The accuracy of UTDOA is expected to be somewhat worse than that of A-GPS though, mainly because the radio propagation conditions are worse along the surface of the earth than when GPS radio signals are received from satellites at high elevation angles.

SUMMARY

A general problem with existing positioning methods based on cell-ID is that the accuracy of the determined positions is low. The confidence value is normally not determined with the best possible accuracy, with respect to the calculated cell area.

A general object of the present invention is thus to provide for methods, devices and systems giving possibilities for improved position determination accuracy. A further object is to provide for methods and devices providing positioning assisting data allowing for position determinations of a higher accuracy. Yet a further object of the present invention is to provide for methods, devices and systems operating with smaller distinguishable areas. It is also a further object of the present invention is to provide for methods, devices and systems which provide defined areas having a well established confidence value.

The above objects are achieved by methods, devices and systems according to the enclosed patent claims. In general words, the present invention introduces a method for provision of position determination assisting data. The position determination assisting data comprises area definitions, each of which being related to a respective quantized path loss measurement index vector. The components of this vector consist of indices corresponding to the values of quantised path loss measurements or quantised signal strength measurements or a mix of these two. In a possible embodiment of the present invention, measurements can be expressed relative to at least one of the other measurements, e.g. representing the weakest or strongest value or selected according to another appropriate selection criterion, such that relative values are used in the quantised path loss measurement vector. Each index must also contain a unique identity of the RBS, or cell, with which the quantised path loss measurement is associated. One component of the quantised path loss measurement index vector is used for each RBS, or cell, from which path loss measurements or signal strength measurements are obtained. The area definitions are in particular embodiments polygons, which preferably are re-calculated successively, automatically and on-line. The recalculations are preferably based on high-precision position measurements of opportunity, clustered with respect to the prevailing quantised path loss measurement index vector for that user equipment performing the high-precision position measurements. Preferably, the area definitions are calculated with a predefined confidence level.

The position determination assisting data is preferably used to determine a position of a user equipment. A quantised path loss measurement index vector for the user equipment to be positioned is determined and the related area definition can be used as an approximation of the user equipment position. The area definition obtained in this manner can also be utilized as refined prior position information, e.g. for A-GPS or UTDOA positioning, and to refine RTT positioning.

The present invention also provides devices and systems for carrying out the methods described above. All functionality of the invention is in a typical embodiment located in a positioning node, e.g. a RNC, a SAS (Stand Alone SMLC (Serving Mobile Location Centre)) node, a support node for configuring and monitoring of the system, or in a completely stand alone node. However, it is also possible to have different parts implemented in different nodes communicating with each other.

Among the numerous advantages of the present invention can be mentioned the following: A database of area definitions for quantised path loss measurement index vectors is built up adaptively and automatically. In preferred embodiments the area of the area definitions, typically a polygon, is minimized for a specific value of the confidence. This maximizes the accuracy of the positioning method. The confidence is easily determined accurately. The performance of the UTDOA and A-GPS positioning methods can be improved by initial positioning data obtained by the present invention. The area definition information is automatically refined, a fact that is useful e.g. when parts of the Radio Network (RAN) is re-planned.

BRIEF DESCRIPTION OF THE DRAWINGS

The invention, together with further objects and advantages thereof, may best be understood by making reference to the following description taken together with the accompanying drawings, in which:

FIG. 6 is an illustration of a 3GPP polygon message information element;

DETAILED DESCRIPTION

In the present disclosure "position determination assisting data" is used to define data that is used in activities related to quantised path loss measurement index vectors in cellular communications systems, such as radio network planning or positioning.

In the present disclosure, WCDMA systems are used as a model system. However, anyone skilled in the art realizes that the basic principles of the present invention are applicable to any cellular communication system. The invention is thus not limited to the exemplifying embodiments as such.

Figure 1:
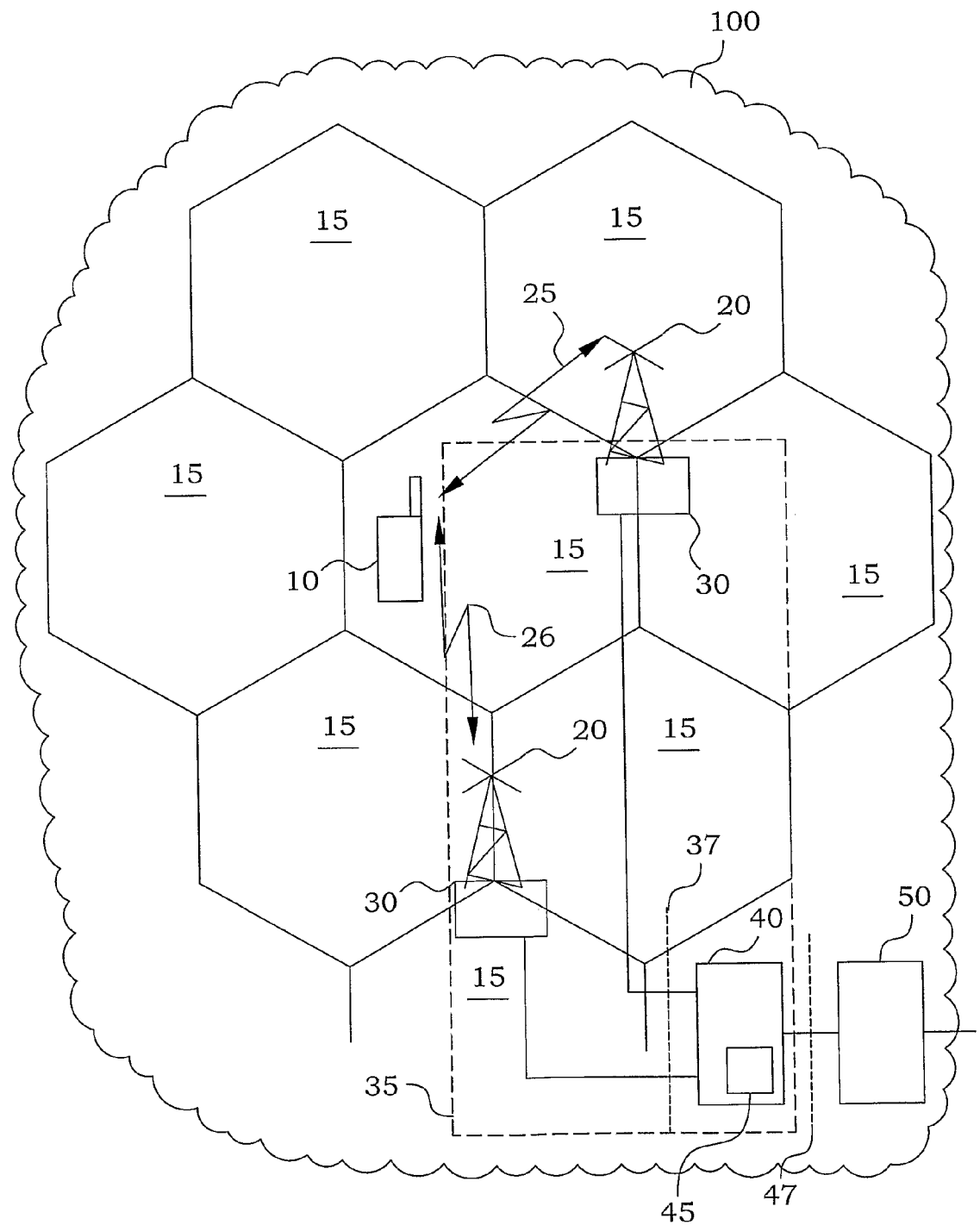
FIG. 1 is an illustration of a cellular communications system.

FIG. 1 illustrates a general WCDMA system 100. Radio base stations 30 (RBS) are spread over the coverage area of the system and serves antennas 20, which in this embodiment are sectorized antennas. A cell 15 is associated with each sector of the antennas 20, as the area in which connection to the communications system preferably is performed through that particular sector. The RBSs 30 are connected to a Radio Network Controller (RNC) node 40, which in a typical case comprises a positioning node 45. The UEs 10 and the RNC 40 communicates over the so-called RRC (Radio Resource Control) interface 37 that is transparent to the RBS 30. The RBSs 30 and the RNC 40 are nodes comprised in the UTRAN (Universal Mobile Telecommunication System Radio Access Network) 35. The RNC 40 is further connected to the Core Network (CN) 50 of the communications system 100 via a RANAP (Radio Access Network Application Part) interface 47.

A user equipment (UE) 10 is situated in the area covered by the cellular communications system 100. The user equipment communicates with the own radio base station 30 through signals 25. However, also signals 26 from and to neighbouring RBSs 30 may be possible to detect and to characterise according to a measured path loss or signal strength. Neighbouring signals 26, however, may also be too weak to enable any use at all.

Figure 2A:
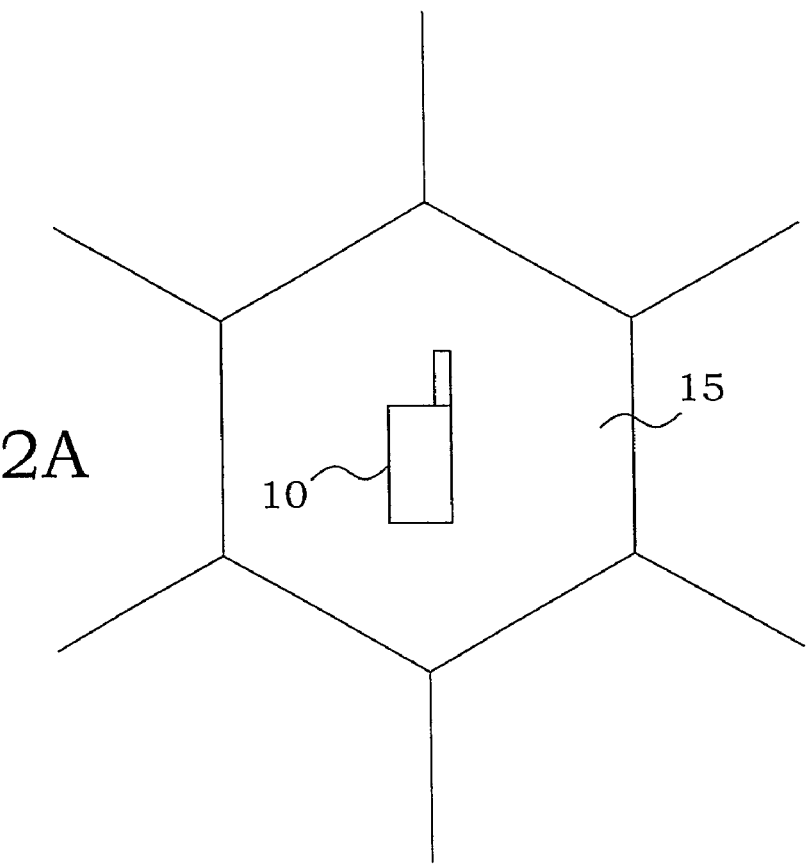
FIGS. 2A-C are illustrations of examples of division of a cell into smaller areas according to coverage from neighbouring cell signals.

FIG. 2A illustrates a cell 15, with a UE 10 connected. For simplicity in the coming explanations, the RBS is in this case assumed to be placed at the centre of the cell, a so-called omni-cell configuration. When the UE 10 is connected to the RBS, it can with a certain probability be determined to be present within the cell 15.

Figure 2B:
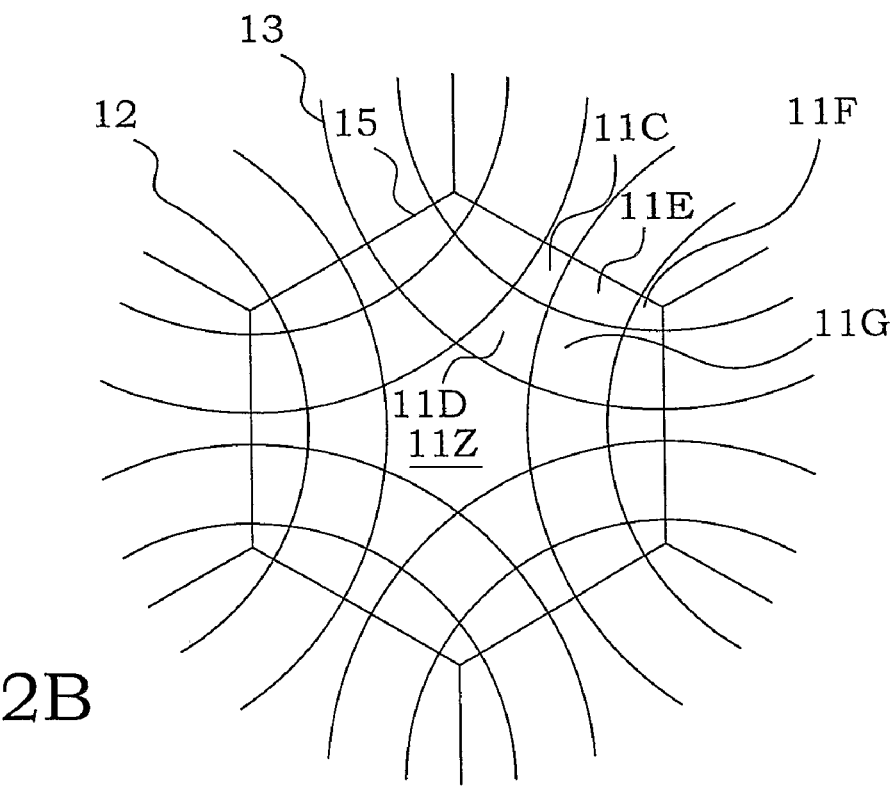

However, often the UE can detect and measure path loss or signal strength with respect to other base stations than the strongest one of the own cell. In FIG. 2B circular borders are shown that represent a particular path loss or signal strength of a signal that originates from RBSs located in the centre of said circular borders. The regions within any two such borders of one RBS represent a region that can be characterised by an index derived by a quantisation function with quantisation intervals between said two borders. The actual selection of this index is arbitrary as long as the index is unique for a specific region and as long as the set of indices represent areas representing the entire coverage region of the particular RBS. There must also be a part of the index that uniquely defines the involved RBS.

It is also clear from FIG. 2B that regions between borders of two or more RBSs sometimes overlap. In such an overlapping area the intersection of the circular strips of two of more RBS can be uniquely represented by the indices that represent each of said circular strips. The indices can be conveniently organised in a vector structure, whereby this vector structure is equivalent to the quantised path loss measurement index vector discussed above. It is clear that the components of the quantised path loss measurement index vector may be based on path loss or signal strength measurements, or a combination thereof. The quantised path loss measurement index vector then provides an area definition of a size that can be much less than the area of the whole cell.

In WCDMA, such area definitions can conveniently be polygon definitions. However, using prior art cell planning principles would normally not provide area definitions determined with the best possible accuracy, with respect to the true extension of any area definitions corresponding to quantised path loss measurement index vectors. Furthermore, the confidence value of any area definitions corresponding to quantised path loss measurement index vectors would normally, using prior art methods, not be determined with the best possible accuracy, with respect to any such area. It would therefore be advantageous to tune the confidence for each cell, using field data. This can normally not be afforded though, in particular since the radio conditions may change with time, even more than for the basic cell. However, the present invention reveals a way to obtain such tuning automatically.

As mentioned above, the real situation is, however, not so ideal as the examples of FIGS. 2A and 2B may indicate. Instead, the borders 12, 13 are not easily determined and are typically non-circular. FIG. 2B illustrates a situation that could correspond to a real situation. Anyone skilled in the art, then realises that any theoretical pre-determination of cell areas is impossible in practice.

According to the present invention, two types of information are connected to each other in order to achieve the advantages of the present invention; quantised path loss measurement index vectors and high-precision positioning data.

Figures 2C, 3:
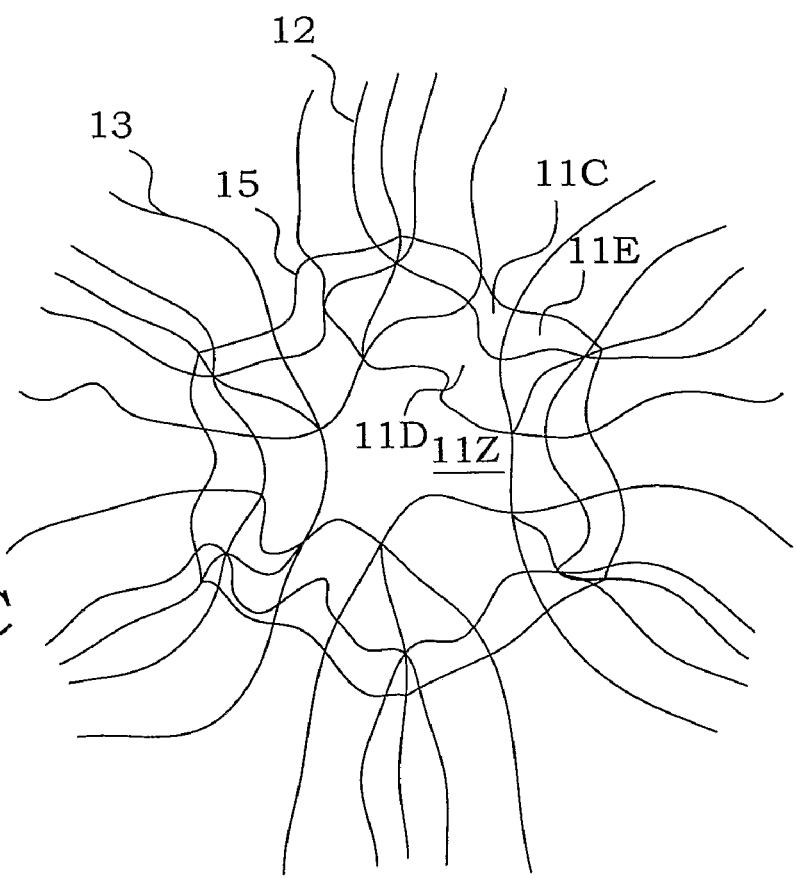
FIG. 3 is an illustration of an example of a quantised path loss measurement index vector.

The first type of information is quantised path loss measurement index vectors. This corresponds to the divisions in the previous examples of FIG. 2A-C. It comprises in a basic embodiment data representing quantised path loss information of neighbouring cells, in which the RBS corresponding thereto transmits/receives detectable signals to/from the user equipment in question which fulfil a certain criterion. In a typical view, the quantised path loss measurement index vectors can be considered to correspond to signals fulfilling a specific radio condition criterion with respect to a certain UE. FIG. 3 illustrates an embodiment of such a list. The first row corresponds to the own cell. The UE can in this example determine the path loss with respect to 5 RBSs, whereby the quantised path loss measurements are qPL1, qPL2, qPL3, qPL4, qPL5. Each combination of radio base station ID and quantised path loss measurements, expressed as a quantised path loss measurement index vector, defines a particular geographical region.

The second type of necessary data is as mentioned further above high-precision positioning data. This can be derived in any possible way. UTDOA and A-GPS are mentioned earlier in the background, but other methods can be useful as well. The inventive idea is to collect relations between high-precision positioning data and the quantised path loss measurement index vector for the corresponding UE at the positioning instant. This is preferably performed by using measurements of opportunity, i.e. high precision measurements that would anyway be performed for some other reason. Alternatively, the measurements could be arranged on purpose. For instance, e.g. for the purpose of improved radio network planning, high-precision position measurement devices could be spread over a certain area in a planned manner. Positions are determined as well as quantised path loss measurement index vectors. Another alternative could be to regularly order user equipment capable of high-precision positioning to provide such measurements. For each possible quantised path loss measurement index vector a measurement list is then set up. All high-precision measurements that are related to a specific quantised path loss measurement index vector are then collected in one specific list of high-precision measurements. In other words, the high-precision positioning data are clustered dependent on the prevailing quantised path loss measurement index vector. The measurements of one such list thus form a cluster of measurements that can be expected to be located in a specific geographical area. The clustering of results of the high-precision position determinations thus gives a number of separate clustered results. When a suitable number of high-precision positioning data points are clustered in one of the separate clustered results, it is possible to define an area which contains a pre-determined fraction of the high-precision positioning data points. It can then be concluded that a UE having a certain quantised path loss measurement index vector is situated within the defined area with a confidence level corresponding to the pre-determined fraction.

In other words, a UE that not by itself has any high-precision positioning capabilities may utilise previous high-precision positioning of other UEs for achieving an improved accuracy in position determination.

It can be noticed that the achieved area definitions can be considerably different from the actual radio coverage. The reason is that areas having good radio conditions but never hosting any user equipments will tend to be excluded from the determined area. The associated area will instead be an area based on a combination of radio coverage properties and probability for user equipment occurrence.

Figure 4A:
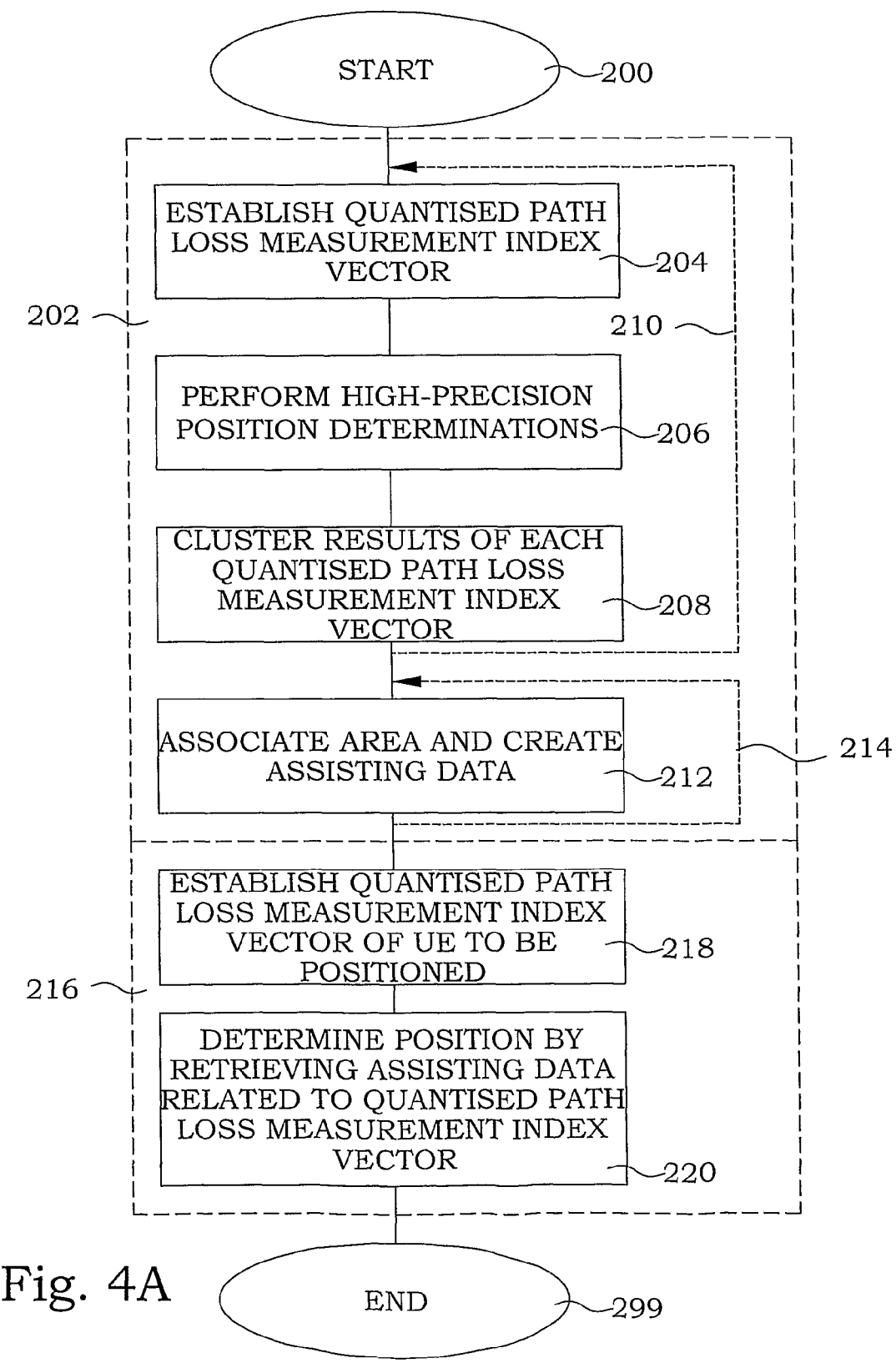
FIG. 4A is a flow diagram of the main steps of an embodiment of a method according to the present invention.

The ideas of the present invention can also be illustrated by a flow diagram of the main steps of an embodiment of a method according to the present invention, illustrated in FIG. 4A. The procedure starts in step 200. The procedure first comes to a section 202 for providing position determination assisting data. This section starts with a step 204, in which a quantised path loss measurement index vector for a particular UE is determined. The signals are typically registered and reported according to standard cellular communication system procedures and compiled to a quantised path loss measurement index vector. In step 206, a high-precision positioning of the UE is performed, using any suitable high-precision positioning method. In step 208, the high-precision positioning data is clustered dependent on the determined quantised path loss measurement index vector. The steps 204 to 208 are repeated a number of times, as indicated by the arrow 210.

When an appropriate number of measurement points are available for a certain quantised path loss measurement index vector, the procedure may continue to step 212, in which an area is determined, which resembles the spatial distribution of the high-precision positioning data. Preferably, an area as small as possible is computed, which still contains a pre-determined fraction of the high-precision positioning data. In other embodiments, one may be satisfied with a fairly small area, even if the area is not the absolute mathematical minimum. A relation between a certain quantised path loss measurement index vector and an area definition is thereby achieved. If further data is added by the steps 204-208, the step 212 may also have to be repeated as indicated by arrow 214. In particular, if the radio conditions are changing, permanently or for a longer period of time, the area definitions have to be re-calculated and adapted to the new situation. Each high-precision position measurement is then also preferably time stamped in order to make it possible to discard high-precision position measurements that are too old, and successively performing new area optimizations.

The time stamping can also be utilised in systems where the distribution of user equipments is likely to differ considerably between different times. For instance, if an office complex and a residence area are comprised close to each other, it is e.g. more likely to find the user equipments in the residence area during the nights. Such variations can be dealt with by discarding high-precision positioning data having a recording time of the day, of the week, or of the year that is considerably different from the present time. In other words, the clustering can be performed by only selecting measurements fulfilling a certain additional criterion. The area definitions can thereby be made time dependent.

The selection criterion for the clustering can also be made on other parameters. The Radio Access Bearer (RAB) could, e.g., be one selection parameter. The coverage for different RABs can differ considerably and the borders between different part areas can thereby change their position considerably. For instance, traffic transmitted by a 64 kbps link may have a completely different coverage area than traffic transmitted by a 384 kbps link. By also clustering the measurements e.g. with respect to the used RAB, will enable an improved positioning, since the area to be determined is unique for the actual RAB used.

The information about the RAB is a type of auxiliary information about circumstances of signalling that makes the selection criterion more area selective. In a general approach, other auxiliary information can also be utilised in an analogue manner. Similarly, there are also auxiliary measurements of signalling properties that can be performed and used as a part of the selection criterion. An example is e.g. auxiliary RTT measurements, which is discussed further below. The selection criterion can be thought of as an augmentation of the quantised path loss measurement index vector.

The step 212 can be performed for one particular quantised path loss measurement index vector, a group thereof, or all quantised path loss measurement index vectors as well as for different clustering selection criteria.

The lists of measurements are preferably organized hierarchically so that lists at higher levels can be constructed from lower levels in case the number of measurements at lower (more detailed) level would be insufficient for a reliable computation of a cell polygon.

When a UE is going to be positioned, the procedure enters into the section 216 for position determination. This section starts with a step 218, in which a quantised path loss measurement index vector for the UE to be positioned is determined. This is typically performed in an analogue manner as in step 204. In step 220, the relation between a certain quantised path loss measurement index vector and an area definition is used to provide an area in which the UE to be positioned is situated with a certain confidence. This confidence level corresponds to the pre-determined fraction used during the area optimization. The procedure ends in step 299. The accuracy of the positioning may be, in the best cases, sufficient for, e.g., the North-American E-911 emergency positioning requirements. However, positions achieved in this manner should not be used to improve the area definitions according to the section 202.

Figure 4B:
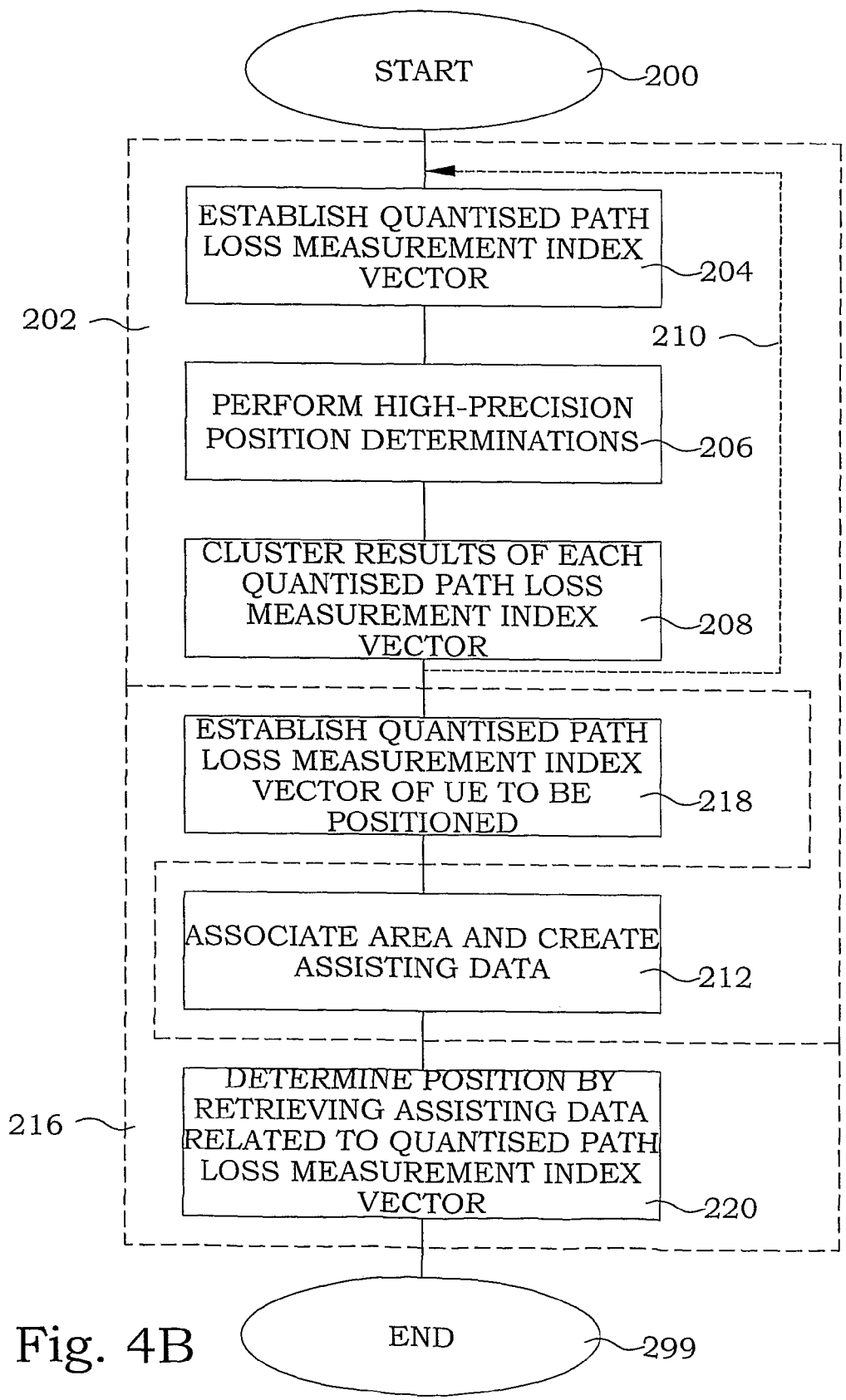
FIG. 4B is a flow diagram of the main steps of another embodiment of a method according to the present invention.

The timing of the different steps can be somewhat differing. In FIG. 4B, a flow diagram of another embodiment of a method according to the present invention is illustrated. Here the two sections 202 and 216 are interleaved with each other. The step of optimising the area 212 is here triggered by the step of determining the quantised path loss measurement index vector 218. The optimising step 212 is then preferably performed just for the quantised path loss measurement index vector that was determined in step 218, in order to save time. If the relations are determined in advance, i.e. before the actual positioning request occurs, as in FIG. 4A, the positioning can be performed with a shorter delay. The embodiment of FIG. 4B instead ensures that the latest available data always is utilized.

Figure 4C:
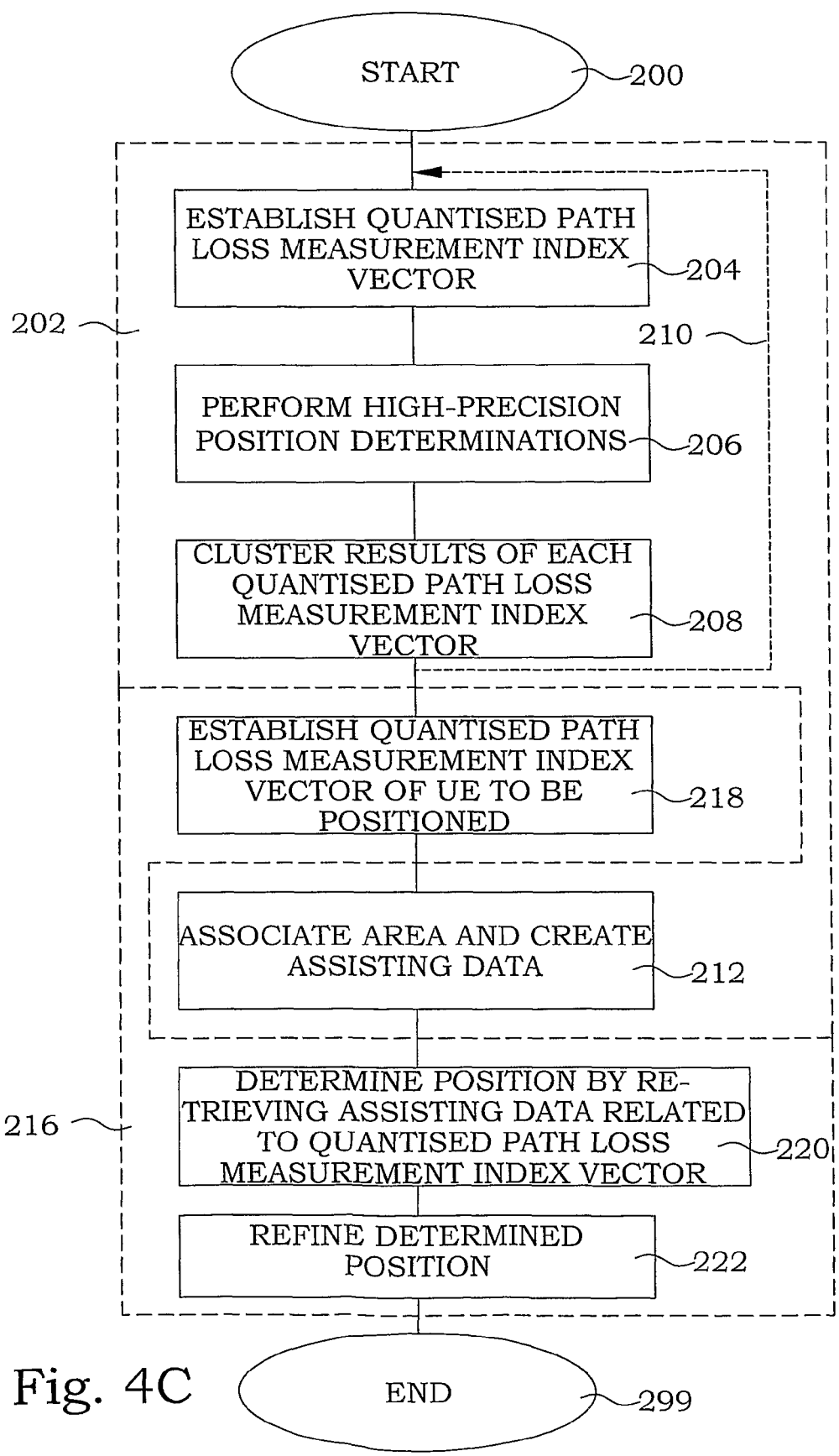
FIG. 4C is a flow diagram of the main steps of yet another embodiment of a method according to the present invention.

The position determined in step 220 can constitute the final positioning, or it can constitute assistance data for a refined positioning. This is illustrated in FIG. 4C. Here an extra step 222 is included, where the position as achieved from the relation of step 220 is utilised in a further positioning method in order to refine the positioning further. Such further positioning methods can e.g. be RTT positioning or A-GPS positioning, which are discussed further below.

Figure 4D:
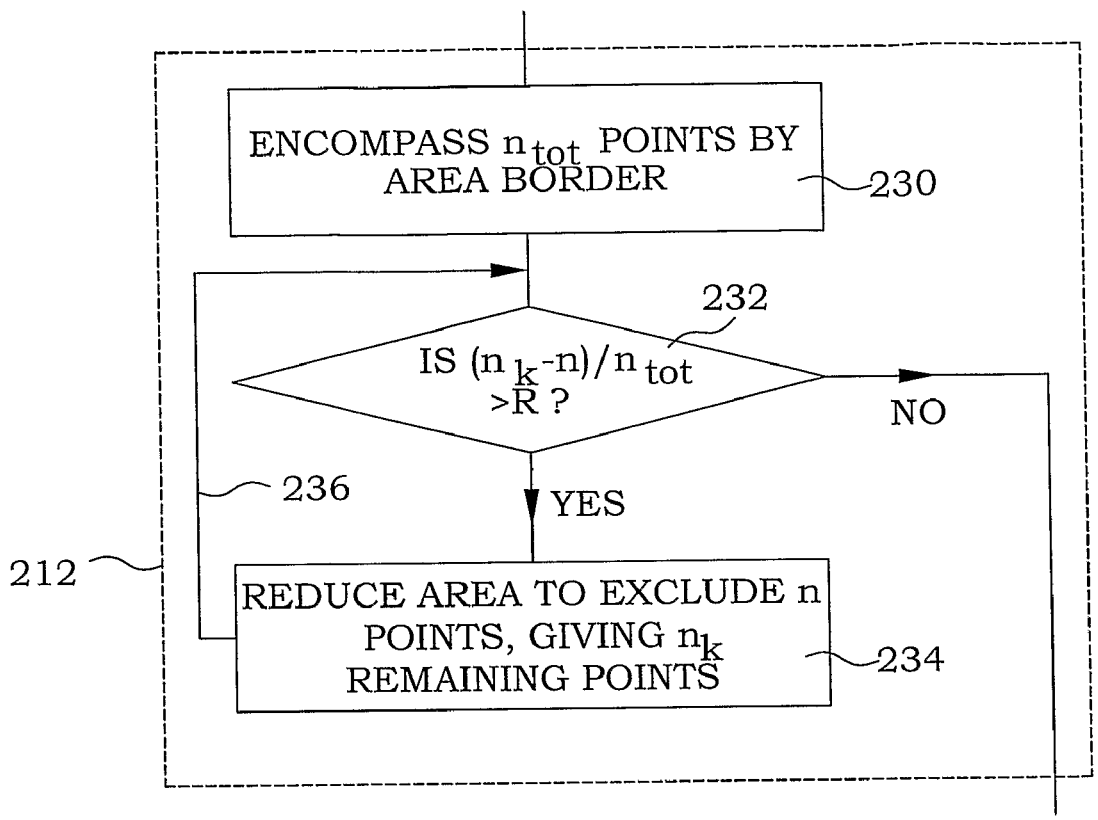
FIG. 4D is a flow diagram of the steps of an embodiment of step 212 of FIGS. 4A-D.

The step of optimising the area 212 can be considered as one of the more important parts of the present invention. In FIG. 4D, a presently preferred embodiment of this step is described more in detail. In step 230, all the high-precision measurement points, $n_{TOT}$, for the quantised path loss measurement index vector in question are encompassed by an area border. $n_{TOT}$ is subsequently used as the inputted number of high-precision measurement points in the first iteration of the following step. In step 232, it is checked if the ratio $(n_k-n)/n_{TOT}$ is larger or equal to a predetermined fraction R, where n is the number of high-precision measurement points that is intended to be removed during the next iteration of the routine. If the ratio is large enough, the area reduction can proceed at least one step further, and the procedure continues to step 234. In step 234, the area is reduced according to a certain pre-determined action plan to exclude n of the inputted high-precision measurement points, leaving $n_k-n$ remaining points, which is set as the new inputted number of high-precision measurement points for the next iteration. Preferably, step 234 is performed in such a way that the area is minimized or at least reduced. The process returns to step 232 again, which is illustrated by the arrow 236. If the ratio in step 232 becomes smaller than R, the process is interrupted, since one more iteration would cause the ration to fall below R, and the area is subsequently used as the area associated with the quantised path loss measurement index vector in question.

Figure 5:
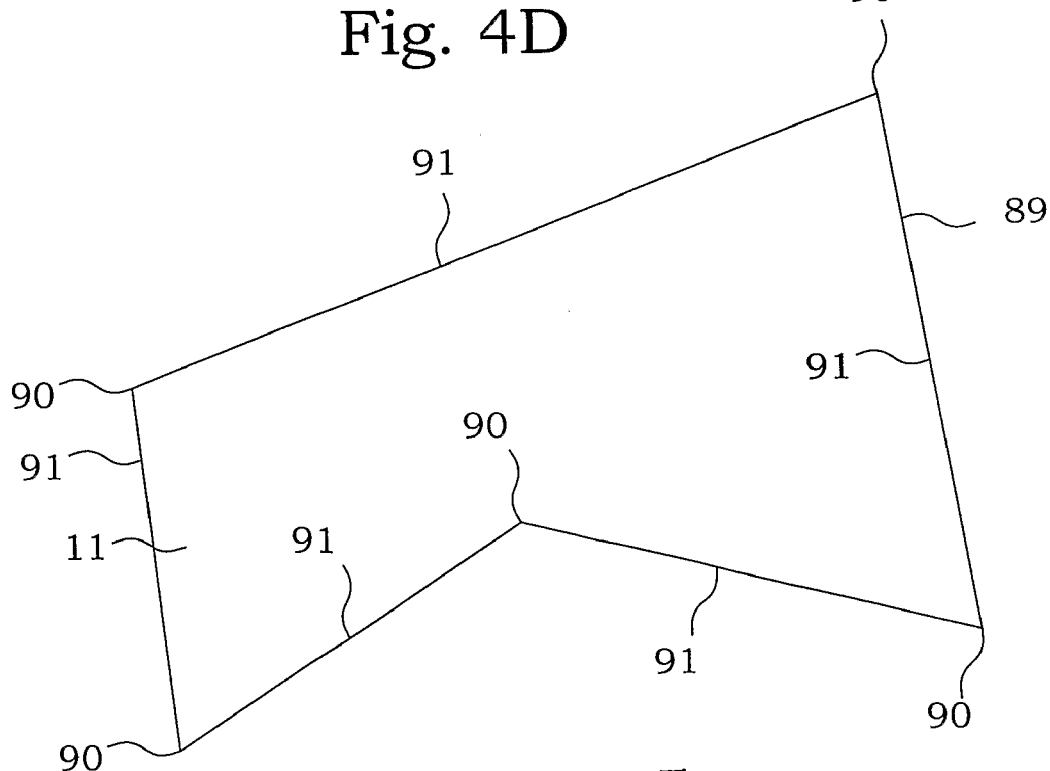
FIG. 5 is an example of a cell polygon.

In several systems, among these the WCDMA (Wideband Code Division Multiple Access) system, the preferred representation of the geographical extension of the cell is given by a cell polygon format. The extension of a cell is described by 3-15 corners of a closed polygon which does not intersect itself. The format is two-dimensional and the corners are determined as pairs of longitudes and latitudes in the WGS84 geographical reference system. An example is illustrated in FIG. 5. There, an example of a cell polygon 89 with corners 90 is illustrated. The RBS (Radio Base Station) is typically located close to one of the corners 90 of the cell polygon 89 said RBS serves. 3GPP systems provide for a messaging format for cell polygons. FIG. 6 illustrates the used 3GPP Polygon message IE (Information Element). This IE is present in the LOCATION REPORT message that is returned to the core network over the RANAP interface after a successful positioning.

When the present invention is used for positioning a polygon that corresponds to the specific quantised path loss measurement index vector is reported over RANAP or Iupc. Note that since the calculated polygons are consistent with the reporting format the invention fits directly into existing positioning interfaces.

The area definition data should be organized so that it can be efficiently addressed by using the quantised path loss measurement index vectors. In this way, fallback areas covering replacement regions can be found whenever areas for certain regions have not been computed. Note that this situation may occur, e.g. because of insufficient measurement statistics.

For instance, in case no polygon is computed for the specific quantised path loss measurement index vector, then the hierarchical structure of the stored quantised path loss measurement index vectors and area definitions is exploited in some way. One alternative is to disregard the last component of the quantised path loss measurement index vector and look for the polygon for the reduced quantised path loss measurement index vector. Note that it is crucial to use both the information on cell/RBS and the quantised path loss measurement index of each component of the quantised path loss measurement index vector in the look-up procedure. In case there is a polygon for this reduced quantised path loss measurement index vector, then this polygon is reported over RANAP or Iupc. In case there is still no polygon computed then the second last component of the quantised path loss measurement index vector is removed and the procedure is repeated. This procedure can continue up to top level, where the quantised path loss measurement index vector contains a single index. It should be noted that there are many alternative strategies that are possible here.

Presently preferred embodiments for optimizing polygons are presented in detail in Appendix A. Briefly, one embodiment is simply focused on minimizing the total area around the clustered results while maintain a constraint of the confidence value. A non-linear optimization problem can be formulated and solved for this procedure.

Another embodiment is directed to a simple method for successively shrinking the cell area. The method is initiated by encompassing the clustered results associated with the quantised path loss measurement index vector(s) in question by a polygon. The shrinking procedure is then based on altering the position of one corner of the polygon at a time along a first predetermined path according to predetermined routines or rules. Typically, these rules allow for exclusion of a predetermined number of high-precision position determinations from the interior of the shrinking polygon. Preferably, the corner capable of giving the best improvement according to a predetermined criterion is selected to be moved in each step. The predetermined criterion can e.g. be an as large area reduction as possible. The predetermined criterion can alternatively be an as large distance reduction as possible between the centre of gravity of all high-precision position determinations within the area and a polygon corner. In particular, the corner selection can be decided by making tentative alterations of each corner and check what improvements on the predetermined criterion they will cause. This corner altering step is then repeated until only a predetermined percentage of the high-precision position determinations of the cluster remains within the polygon. The first predetermined path is typically a curve through the original corner position and the centre of gravity for the clustered high-precision positions. In the simplest form, the curve is a straight line through the original corner position and a centre of gravity.

In a particular embodiment of the present invention, the altering of the polygon corner allows one of the high-precision position determinations to be placed outside the polygon, but not two of the high-precision position determinations. This typically brings one of the clustered high-precision position determinations to be placed on or in the vicinity of a connection line between the altered corner and a neighbouring corner. In a more elaborate embodiment, the altering can comprise alternative predetermined paths, and the optimum choice among tentative alterations along all these alternatives can be selected.

Figure 11:
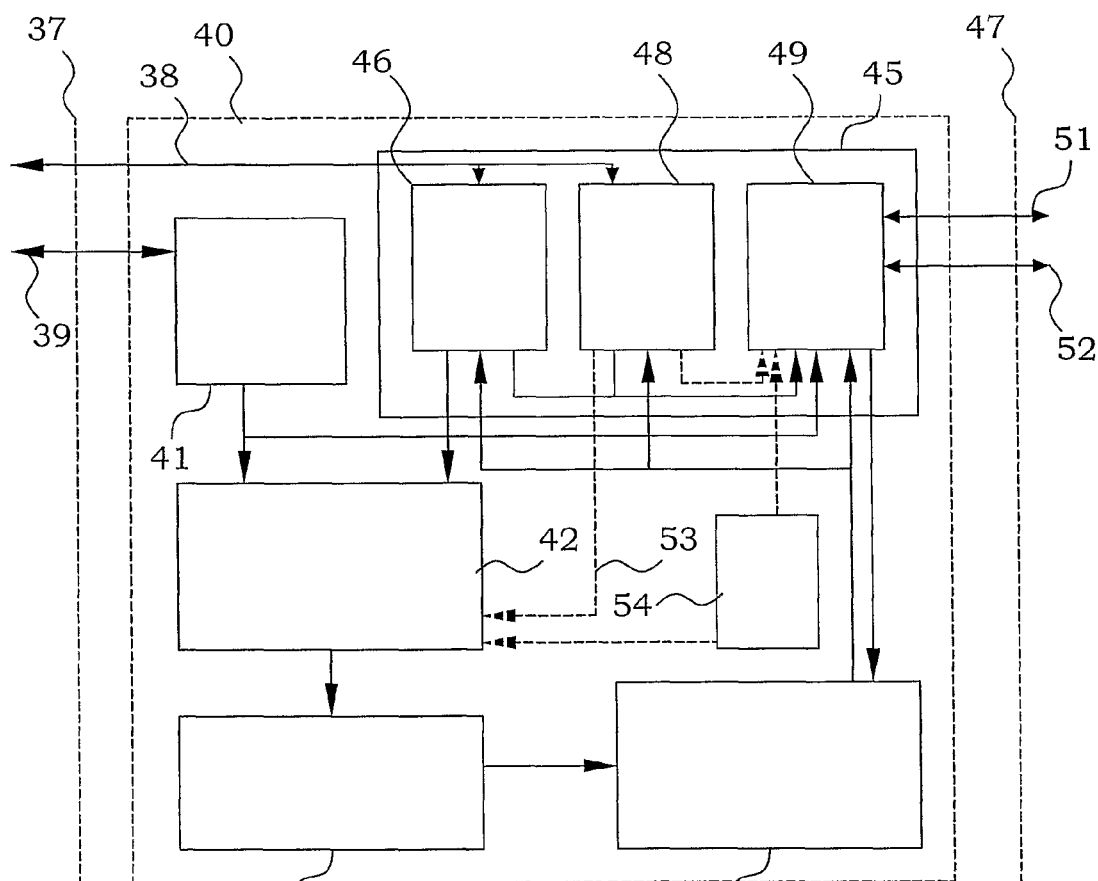
FIG. 11 is a block diagram of the main parts of an embodiment of a node according to the present invention.

FIG. 11 is a block diagram of an embodiment of a positioning node 45 and related functionality according to the present invention. In the present embodiment, which is assumed to be comprised in a WCDMA system, such functionality is preferably comprised in the RNC 40. Another possibility is to implement the invention in the SAS node (e.g. an Ericsson SMLC) on the other side of the Iupc interface 47. Still another possibility is to log measurements and perform the algorithms in OSS-RC or even a completely external node. New interfaces and/or information elements in existing interfaces allowing for exchange of path loss or signal strength measurements and measured high-precision position determination results may then be necessary.

In the case the position determination assisting data, i.e. the relations between the quantised path loss measurement index vector and the associated areas are produced in an external node, the information has to be provided to a positioning node in order to assist in position determination procedures. The position determination assisting data can then preferably be stored at a computer readable medium, and supplied to the positioning node in a suitable manner, e.g. by downloading the content over a communication link or simply by providing a data memory device having the data stored therein.

The RNC 40 communicates with UEs, transparently via RBSs, using the RRC interface 37. In the present context, at least two information types are of interest; positioning measurements 38, in particular high-precision positioning measurements, and path loss/signal strength measurements 39 performed in the UE with respect to different RBSs/cells. The path loss/signal strength measurements 39 are provided to a quantised path loss measurement index vector section 41 which determines the quantised path loss measurement index vectors. The determined quantised path loss measurement index vector of a particular UE is provided to a clustering section 42.

The positioning measurements 38 are provided to the positioning node 45. The high-precision positioning measurements are provided to a high-precision positioning section 46, which e.g. can comprise UTDOA or A-GPS based positioning. Other positioning measurements, e.g. cell ID or RTT positioning measurements are in the present embodiment provided to a medium-precision positioning section 48. The outcome of the analysis of the high-precision positioning measurements, i.e. high-precision positions are provided to the clustering section 42, where the high-precision position is associated with a corresponding quantised path loss measurement index vector. The measurements are clustered depending on the quantised path loss measurement index vector and in particular embodiments also on other selection criteria such that auxiliary information and/or auxiliary measurements, in particular recording time, utilised RAB and/or RTT measurements. RTT measurements could then, e.g., be provided by the medium-precision positioning section 48 as indicated by the broken arrow 53. Auxiliary information, such as time or utilised RAB, and other auxiliary measurements can be provided by an auxiliary information section 54. This auxiliary information section 54 can be arranged to provide the information internally in the node and/or be arranged to achieve the information from outside.

The clusters of positions for a certain quantised path loss measurement index vector and in some embodiments selected within a specific time interval or using a specific RAB are provided to an algorithmic block 43. In the algorithmic block 43, area definitions are calculated. One important objective of the present invention, to compute an area that describes each cluster of measurements, at a specified confidence level, is performed in the algorithmic block 43. In the WCDMA case, the preferred area definition is a polygon defined by 3 to 15 corner coordinates. In a particular embodiment, the algorithmic block 43 provides polygons such that the probability that a given fraction of high-precision measurements of a cluster are located in the interior of the polygon. This algorithmic block 43 preferably performs repeated re-calculations of polygons, for all measurement clusters with a sufficient number of recent enough high-precision measurements. The area definitions are provided to an area storage 44, where polygons representing a hierarchically organized set of quantised path loss measurement index vector are stored. The stored polygons are then used by positioning algorithms of the system. The data structure of the stored polygons preferably contains a list of pointers covering each relevant quantised path loss measurement index vector. Each such pointer points to a corresponding 3-15 corner polygon, computed repeatedly as described above. The data structure preferably also contains a time tag for each polygon that defines the time when the polygon was computed.

When a position determination according to the principles of the present invention is requested, a quantised path loss measurement index vector is determined in the quantised path loss measurement index vector determining section 41 as usual. The result is forwarded to a control section 49 in the positioning node 45. When a positioning request 51 is received, e.g. a so-called Location Reporting Control message over the RANAP interface 47, the control section 49 may, based on quality of service parameters and UE capability, request a position determination by retrieving an area definition from the area storage 44, which corresponds to the present quantised path loss measurement index vector of the UE. Note that each component of the quantised path loss measurement index vector contains information on both the quantised path loss/signal strength measurement and the RBS/cell to which it is related. It is important to realise that both pieces of information of the component are needed when the definition is looked up. The achieved area definition, preferably a polygon definition is included in a positioning reporting message 52, which typically is sent back over the RANAP interface 47 using e.g. a so-called Location Report message. As in the phase of creating the position determination assisting data, auxiliary information, such as time or utilised RAB, and other auxiliary measurements can also be used to refine the selection of the area definition. Such data is achieved by the auxiliary information section 54.

If the area definitions are to be used together with any additional positioning method, the retrieved area from the area storage 44 is provided to the high-precision positioning section 46 or the medium-precision positioning section 48, depending on the method to be used. The final determined position is then provided to the control section 49 for further reporting.

Most functionalities of the quantised path loss measurement index vector determining section 41, the high-precision positioning section 46, the medium-precision positioning section 48 and the control section 49 are typically available in prior art systems. However, connections creating relations between the quantised path loss measurement index vector determining section 41 on one side and the high-precision positioning section 46, the medium-precision positioning section 48 and the control section 49 on the other side are previously unknown. Furthermore, the clustering section 42, the algorithmic block 43, the area storage 44 as well as connections thereto are entirely novel. So is also functionality in the quantised path loss measurement index vector determining section 41, the high-precision positioning section 46, the medium-precision positioning section 48 and the control section 49 needed for communicating with these novel functionalities.

Figure 12:
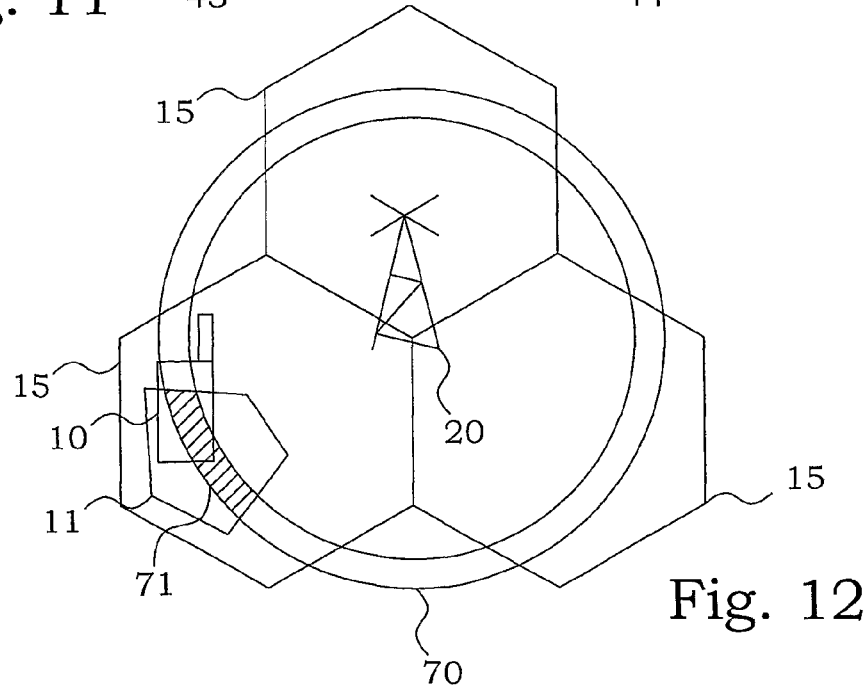
FIG. 12 is an illustration of RTT measurements.

The present invention can be further refined by combining the area definition, corresponding to a quantized path loss measurement index vector, with a distance measure. One possibility towards this end is round trip time measurements. The round trip time measurement principle is depicted in FIG. 12. Briefly, the travel time of radio waves from the RBS antenna 20 to the UE 10 and back is measured. The distance r from RBS antenna 20 to UE 10 then follows from the formula:

$$r = c\frac{T_{RTT}}{2},$$

where $T_{RTT}$ is the round trip time and where c is the speed of light.

The round trip time measurement alone defines a circle, or if the inaccuracy is accounted for, a circular strip 70 around the RBS antenna 20. By combining this information with the area definition, preferably a polygon, left and right angles of the circular strip 70 can be computed. When an area definition 11 according to the basic principles of the present invention is available, the section 71 of the circular strip 70 on which the UE can be situated can be further decreased, which is evident from FIG. 12.

A combination between the basic principles of the present invention and RTT measurements can also be obtained in an alternative way. In such an embodiment, RTT measurements can be quantified and used as an additional parameter for the selection criterion for the clustering according to the present invention. The use then becomes analogous with the selection based on different RABs. The procedures according to the present invention then are used for building areas corresponding also to different RTT measurement results. In practice, despite its appeared complexity, this may even be advantageous, since the real radio signal propagation often can be significantly different from theoretical evaluations, making the circular description of FIG. 12 only a rough approximation. In GSM applications, TA measurements corresponding to coarse RTT measurements, could be utilised.

Figure 13:
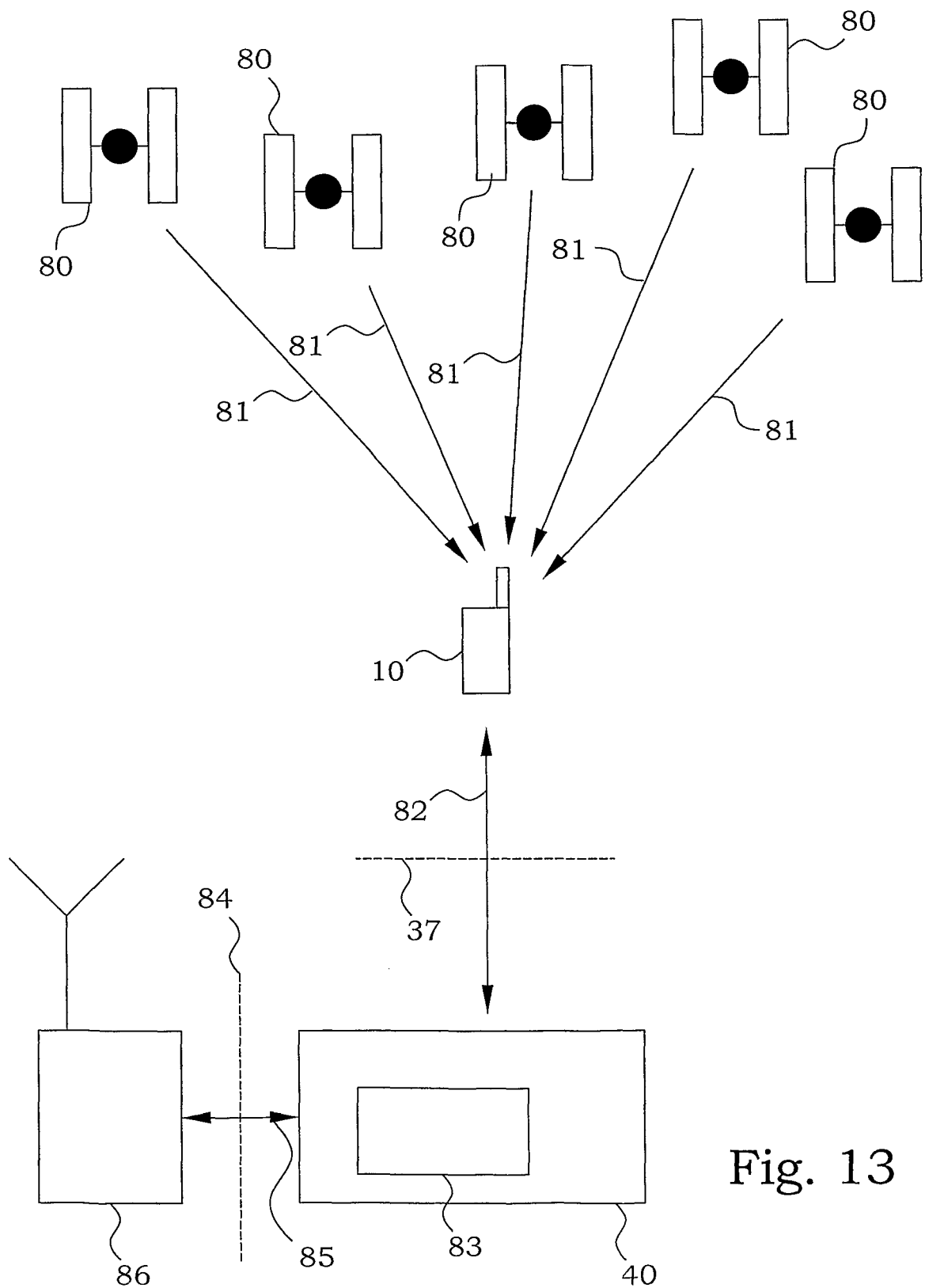
FIG. 13 is an illustration of A-GPS measurements.

Also A-GPS performance can be further enhanced by the present invention. FIG. 13 illustrates a typical A-GPS system. A UE 10 receives GPS ranging signals 81 from a number of space vehicles 80. A reference GPS receiver 86 has knowledge about e.g. synchronisation of the space vehicles 80 and provides assistance data 85 over a reference receiver interface 84 to a GPS interface 83 of the RNC 40. Orders for position measurements and assistance data 82 are provided over a RRC interface 37 to the UE 10. By measuring the arrival times of the different GPS ranging signals 81, the UE is able to determine a high-precision position based also on the assistance data. A report of the determined position is sent back to the RNC 40. The assistance data used for making this position determination involves among other data also an approximate initial position of the UE 10. The more accurate this initial position is, the more sensitive the detection of the GPS ranging signals can be made. This may in turn lead to a more accurate final position, or a final position of an equal accuracy provided within a shorter time or by means of less demanding processing.

If the high-precision positions also include altitude data, i.e. the position defines lateral position as well as height; the "area definitions" can be calculated as surfaces having a three-dimensional extension. A positioning based on such position determination assisting data will then result in a position also defining some kind of altitude estimate. It is then possible e.g. to report the centre point of the cell, augmented with altitude, as a 3D-point over RANAP. The altitude of a polygon corner can also be estimated, e.g. as a mean value of some high-precision measurements in the vicinity of the corner in question.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

The main parts of the presently preferred embodiment of the present invention are described in detail in this appendix.
Clustering In this particular embodiment, it is assumed that the quantised path loss measurement index vector is based solely on path loss measurements. Corresponding modelling is possible also for other cluster selection rules.

The high-precision position measurements are typically obtained expressed in the WGS 84 geographical reference system. The measurements that are available at time t are denoted $$(lat_j(t_j) long_j(t_j))^T, j=1, \ldots, N(t), \quad (1)$$

where $lat_j(t_j)$ and $long_j(t_j)$ denote the measured latitude and longitude, respectively, at the time $t_j$. $N(t)$ denotes the total number of available measurements at time t. $(\ )^T$ denotes matrix/vector transpose.

At the same time $t_j$ (to within some reasonable accuracy in time), path loss, or equivalently signal strength measurements are performed with respect to multiple RBSs/cells (precisely one measurement per RBS/cell) in the terminal and reported to the RNC over RRC (in the WCDMA case). The measurements (path loss is assumed henceforward) are then quantised. The quantisation replaces the actual measurement value with a quantised counter part that can be represented by an integer. As an example, if a binary quantiser is used, path loss measurements below a threshold (typically ca. 135 dBm) may be represented by the value 1, and path loss measurements higher than the threshold may be represented by the value 2. Hence, the quantised measurements may be thought of as an index. Also a unique identity of the RBS/cell is built into the above index. When all quantised path loss measurements are combined the result is the row vector (or pointer)

$$\text{quantisedPathLossIndex}(t_j)=(qPL_1(t_j), qPL_2(t_j), \ldots, qPL_{N(tj)}(t_j)), \quad (2)$$

where $qPL_l(t_j)$ is uniquely constructed from the quantised path loss measurement as well as from the unique ID of the l:th RBS, for the UE for which high-precision positioning was performed at time $t_j$–$N(t_j)$ is the number of path loss measurements performed at time $t_j$.

An arbitrary possible pointer used for clustering of measurements, defined according to (2), is now denoted by $$\text{Pointer}_k=(\text{Index}_1(k) \ldots \text{Index}_{N(k)}(k)), k=1, \ldots, K \quad (3)$$

where $\text{Index}_l(k)$ is the l:th component of the (fix) pointer k, $N(k)$ is the dimension of the pointer k and K is the number of counters. The corresponding list of high-precision position measurements is denoted by $List_k$. At time t:

$$List_k(t) = \begin{pmatrix} lat_{k,1}(t_{k,1}) & lat_{k,2}(t_{k,2}) & \ldots & lat_{k,M(k,t)}(t_{k,M(k,t)}) \\ long_{k,1}(t_{k,1}) & long_{k,2}(t_{k,2}) & \ldots & long_{k,M(k,t)}(t_{k,M(k,t)}) \\ t_{k,1} & t_{k,2} & \ldots & t_{k,M(k,t)} \end{pmatrix}, \quad (4)$$

where $M(k,t)$ denotes the number of high-precision measurements of list k at time t. As stated above, measurements that are older than a pre-specified threshold are discarded from each list. The maximum size of a list can also be pre-specified, in which case the oldest measurement is discarded irrespective of its age when a new measurement arrives.

When a new high-precision measurement and corresponding set of quantised path loss measurements is obtained at time $t_{N(t)+1}$ the clustering algorithm operates as follows:

```
For k = 1 to K
    If Pointer_k = quantisedPassLossIndex(t_{N(k)+1})
```

-continued $$\text{List}_k(t_{N(k)+1}) = \left( \text{List}_k(t) \begin{pmatrix} \text{lat}_{N(t)+1}(t_{N(t)+1}) \\ \text{long}_{N(t)+1}(t_{N(t)+1}) \\ t_{N(t)+1} \end{pmatrix} \right)$$

```
        end
    else
        do nothing
    end
end
```

Polygon Computation

Notation

In order to facilitate an effective algorithmic description, the following notation is needed:

$p = (p_1 \ldots p_N)$—one specific pointer, corresponding to a specific quantised path loss measurement index vector.

$r_{i,ll}^p = (x_{i,ll}^p \; y_{i,ll}^p)^T$, $i=1, \ldots, N_p$—the polygon corners corresponding to the quantised path loss measurement index vector p in WGS 84 latitude longitude notation.

$r_i^p = (x_i^p \; y_i^p)^T$, $i=1, \ldots, N_p$—the polygon corners corresponding to the quantised path loss measurement index vector p in a local earth tangential Cartesian coordinate system, with the origin somewhere in the coverage area of the cellular system. Coordinate axes are usually east and north, disregarding the altitude.

$r_{j,ll}^{m,p} = (x_{j,ll}^{m,p} \; y_{j,ll}^{m,p})$, $j=1, \ldots, N_p^m$—the high-precision measurements used in order to determine the corners of the polygon corresponding to the quantised path loss measurement index vector p. Note that this measurements corresponds to one of the entries of $\text{List}_k$ that corresponds to p.

$r_j^{m,p} = (x_j^{m,p} \; y_j^{m,p})$, $j=1, \ldots, N_p^m$—the high-precision measurements used in order to determine the corners of the polygon corresponding to the quantised path loss measurement index vector p. The high-precision measurements are transformed to the same local earth tangential Cartesian coordinate system, with the origin somewhere in the coverage area of the cellular system, which is used above.

$C^p$—The specified confidence of the polygon corresponding to p. This value corresponds to the probability that the UE is located within the polygon, when the quantised path loss measurement index vector corresponds to p.

$A^p$—The area of the polygon corresponding to p.

$P^p$—The region defined by the polygon.

Coordinate Transformations

The procedure starts by a transformation of all high-precision measurements corresponding to p to the local earth tangential Cartesian coordinate system, in which all computations are performed. Only the new measurements, which have not already been transformed, need to be processed.

Constrained Cell Area Minimization Problem

The principle behind the computation of the polygon is governed by the following three ideas.

The area of the polygon should be as small as possible, thereby maximizing the accuracy.

The constraint of the confidence value should be maintained, for the high-precision measurements available.

Basic geometrical constraints on the polygon should be maintained, in particular the requirement that the polygon should not be allowed to intersect itself, and that the last numbered corner point is connected to the first (closeness).

The following minimization problem can then be set up for the computation of the corners of the polygon:

$$\{\hat{r}_1^p, \ldots, \hat{r}_{N_p}^p\} = \underset{r_1^p, \ldots, r_{N_p}^p}{\operatorname{argmin}} A^p(r_1^p, \ldots, r_{N_p}^p) \quad (5a)$$

subject to polygon geometric constraints and (5b)

$$\sum_{\substack{j=1 \\ r_j^{m,p} \in P^p}}^{N_p^m} 1 \geq C^p N_p^m. \quad (5c)$$

This is a nonlinear optimization problem. Many methods that may be applicable to the solution of (5a-c) have been developed over the years.

In the following, a new algorithm is disclosed, that instead is based on a direct approach, adapted to the problem at hand. Note that this method may not solve (5a-c) exactly, however, it is based on the same ideas as (5a-c) but in a stepwise manner.

Shrinking Polygon Algorithm

The main idea of this algorithm is to start with an initial polygon that contains all the high-precision measurements collected for the particular quantised path loss measurement index vector. The initial polygon can e.g. be calculated from the centre of gravity of the high-precision measurements, followed by a calculation of the maximum distance from this centre of gravity, for all high-precision measurements. This defines a circle that contains all high-precision measurement points. The initial polygon is then selected to contain this circle.

Following this initial step, the area of the polygon is then reduced in steps, by movement of one selected corner point of the polygon inwards towards the momentary centre of gravity, so that one high-precision measurement point is eliminated from the interior of the polygon, for each step. The area reduction is performed so that the area reduction, at each step, is maximized over all corner points, at the same time as the constraints are maintained fulfilled.

Centre of Gravity

Since the high-precision measurements are treated as points (non-stochastic), the centre of gravity is the arithmetic mean, i.e.

$$r_{CG} = (x_{CG} \; y_{CG}) = \frac{1}{N_p^{m,rem}} \sum_{q=1}^{N_p^{m,rem}} (x_q^{m,p,rem} \; y_q^{m,p,rem})^T, \quad (6)$$

where the superscript$^{rem}$ indicates high-precision measurements that have not yet been removed from the interior of the shrinking polygon by the shrinking polygon algorithm.

Initiation

Since the initiation of the algorithm only affects the $N_p$ first steps of the algorithm, a conservative approach is taken here. The first step is to compute the maximum distance from the centre of gravity, i.e.

$$j_{max}^p = \max_j \sqrt{(x_j^{m,p} - x_{CG})^2 + (y_j^{m,p} - y_{CG})^2} \quad (7)$$

$$r^p = \sqrt{(x_j^{m,p} - x_{CG})^2 + (y_j^{m,p} - y_{CG})^2}. \quad (8)$$

Hence all high-precision measurements are now within a distance $r^p$ of the centre of gravity. Note that, if a finite number of polygon corner points would be spread out around this circle, there is no guarantee that the polygon contains all high-precision measurement points.

Figure 7:
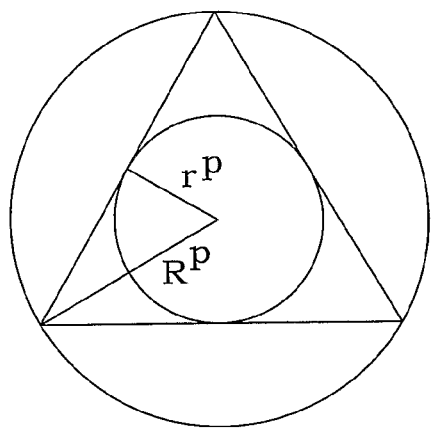
FIG. 7 is an in illustration of an initial geometry for a shrinking polygon method.

Since initial points, symmetrically spread around a circle, is attractive, an additional outer circle is determined, such that it contains the simplest polygon with three corners that contains the circle with radius $r^p$, see FIG. 7. The initial polygon corner points can then be spread out around this outer circle with radius $R^p$. It is geometrically obvious that the largest outer circle is obtained for a polygon defined by the minimum amount of corners, 3.

The outer radius can now be related to the computed inner radius by consideration of FIG. 7. Geometrical symmetry shows that $$R^p = \frac{r^p}{\sin(30)} = 2r^p. \quad (9)$$

The initial polygon corner points $\{r_i^{p,0}\}_{i=1}^{N_p}$ can then be distributed around the outer circle according to $$x_i^{p,0} = x_{CG} + R^p \cos\left(360\frac{(i-1)}{N_p}\right) \quad (10)$$

$$y_i^{p,0} = y_{CG} + R^p \sin\left(360\frac{(i-1)}{N_p}\right). \quad (11)$$

Other strategies are of course also possible.

Maximum Corner Movement

Note that the computations described in this subsection consider high-precision measurement points the remains in the interior of the shrinking polygon, at each iteration step. This is true for (12)-(21) and for (24)-(26), see below.

Movement with Respect to High-Precision Measurement Points

In order to assess which polygon corner that is most beneficial to move inwards at a given iteration step, it is first necessary to determine what the maximum movement is. This needs to take two constraints into account.

The second high-precision point that leaves the polygon when a specific corner point is moved inward along the specified direction towards the centre of gravity constrains the movement inwards. This requires a search over all high-precision measurement points that remain inside the polygon at the specific iteration step of the algorithm.

The first polygon line segment that is intersected when a specific corner point is moved inward along the specified direction towards the centre of gravity constrains the move inwards. This requires a search over all line segments (between polygon corner points) of the polygon.

Both these constraints need to be checked. Together they determine the inward maximum movement.

Figure 8:
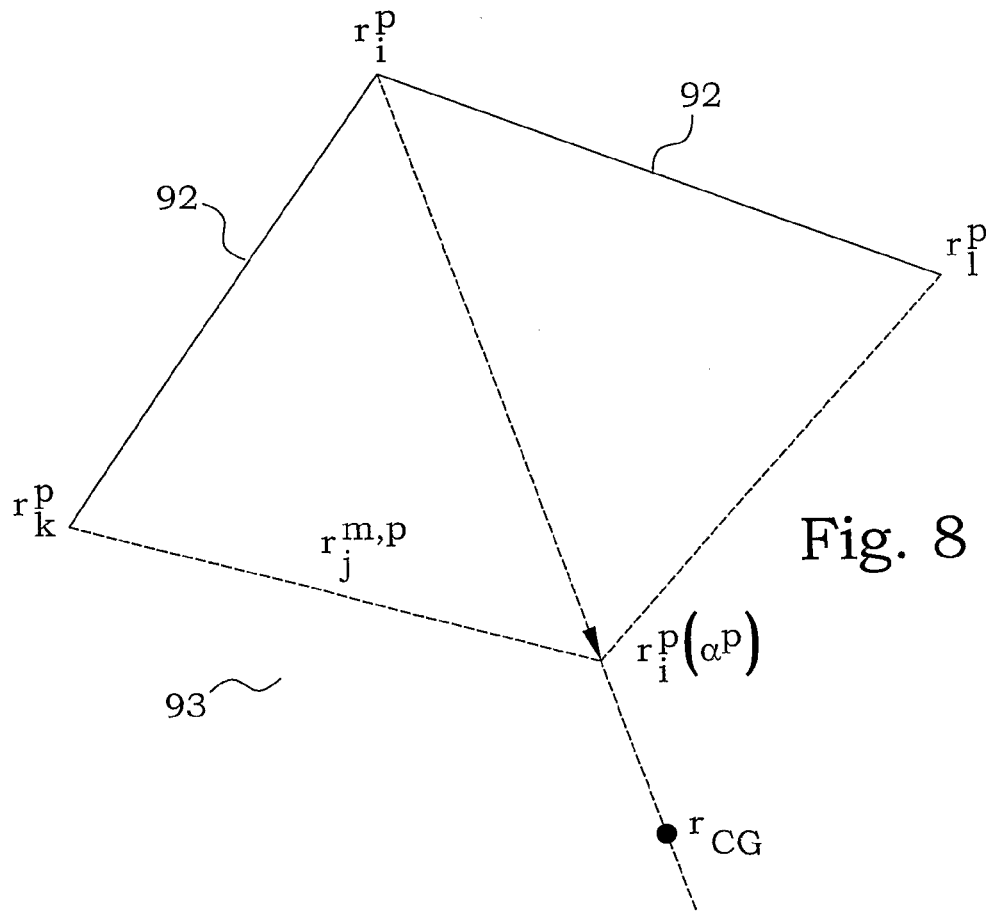
FIG. 8 is an illustration of the geometry used for determining a maximum polygon corner movement.

The maximum polygon corner movement with respect to a specific high-precision measurement point can be determined as follows, referring to FIG. 8. That figure shows a situation with three adjacent polygon corners $r_k^p$, $r_i^p$, $r_l^p$. The arbitrary numbering is due to the need to cover up for the fact that the last and the first of the polygon corner points are connected.

The middle point $r_i^p$ is then moved inwards towards the centre of gravity, i.e. into the interior 93 of the polygon. As a consequence the line segments 92 that connect $r_k^p$ and $r_i^p$, as well as $r_i^p$ and $r_l^p$ also move. At some point of the movement the considered high-precision measurement point may be intersected by either of these two line segments—both needs to be checked.

In order to determine a tentative point of intersection the movement of $r_i^p$ is computed to be $$r_i^p(\alpha^p) = r_i^p + \alpha^p(r_{CG} - r_i^p) \quad (12)$$

Here $\alpha^p$ is a scalar parameter that varies between 0 and 1 when $r_i^p(\alpha)$ moves between $r_i^p$ and $r_{CG}$. Note that this is a standard way to describe a line segment mathematically. Note also that movement may in this case extend beyond the centre of gravity.

A necessary (but not sufficient) requirement for an intersection of the moving boundary of the polygon with the considered high-precision measurement point is that $r_i^p(\alpha^p) - r_k^p$ and $r_j^{m,p} - r_k^p$ become parallel or that $r_i^p(\alpha^p) - r_l^p$ and $r_j^{m,p} - r_l^p$ become parallel. Exploiting the fact that the cross product between parallel vectors is zero, allows for a computation of $\alpha^p$. Straightforward algebra gives the results:

$$\alpha_{ik}^{j,p} = \frac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)} \quad (13)$$

$$\alpha_{il}^{j,p} = \frac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)}. \quad (14)$$

The subscripts indicate the polygon corner points that define the line segment under evaluation. The superscript denotes the index of the high-precision measurement point. Both (13) and (14) are candidates for being an active constraint. Note however, that a requirement for this is that $$\alpha_{ik}^{j,p} > 0 \quad (15)$$

$$\alpha_{il}^{j,p} > 0 \quad (16)$$

In case (15) and (16) do not hold, the corresponding intersection strategy needs to be discarded.

Assuming that (15) and (16) hold, it remains to check if the intersection point falls between the points that limit the line segment of the polygon. This means that the following equations need to be fulfilled, for some $\beta_{ik}^{j,p} \in [0,1]$ or $\beta_{il}^{j,p} \in [0,1]$:

$$r_j^{m,p} = r_i^p(\alpha_{ik}^{j,p}) + \beta_{ik}^{j,p}(r_k^p - r_i^p) \quad (17)$$

$$r_j^{m,p} = r_i^p(\alpha_{il}^{j,p}) + \beta_{il}^{j,p}(r_l^p - r_i^p) \quad (18)$$

Since the vectors leading to (13) and (14) are parallel, it is enough to consider one of the coordinates of (17) and (18) when solving for $\beta^p$. The results are:

$$\beta_{ik}^{j,p} = \frac{x_j^{m,p} - x_i^p(\alpha_{ik}^{j,p})}{x_k^p - x_i^p(\alpha_{ik}^{j,p})} \quad (19)$$

$$\beta_{il}^{j,p} = \frac{x_j^{m,p} - x_i^p(\alpha_{il}^{j,p})}{x_l^p - x_i^p(\alpha_{il}^{j,p})}. \quad (20)$$

The final logic needed in the evaluation of the point $r_j^{m,p}$, with respect to the movement of $r_i^p$, can be briefly summarized as follows. Provided that:

$\alpha_{ik}^{j,p} > 0$ and $0 < \beta_{ik}^{j,p} < 1$, $\alpha_{ik}^{j,p}$ represents a feasible maximum movement for other line segment between $r_i^p$ and $r_k^p$.

$\alpha_{ik}^{j,p} > 0$ and $\beta_{ik}^{j,p} > 1 \vee \beta_{ik}^{j,p} < 0$, $\alpha_{ik}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{ik}^{j,p}=\alpha_{max}$, where $\alpha_{max}$ is a large inward movement, say 10.

$\alpha_{ik}^{j,p}<0$ and $0<\beta_{ik}^{j,p}<1$, $\alpha_{ik}^{j,p}$ represents a feasible maximum movement for the line segment between $r_i^P$ and $r_k^P$. However, since it is an outward movement, it shall be set to zero since the algorithm is designed for inward movement.

$\alpha_{il}^{j,p}>0$ and $0<\beta_{il}^{j,p}<1$, $\alpha_{il}^{j,p}$ represents a feasible maximum movement for the line segment between $r_i^P$ and $r_l^P$.

$\alpha_{il}^{j,p}>0$ and $\beta_{il}^{j,p}>1\vee\beta_{il}^{j,p}<0$, $\alpha_{il}^{j,p}$ represents an inward point but the feasible maximum movement is not relevant since the intersection is outside the line segment between $r_i^P$ and $r_k^P$. In this case the inward movement shall not limit the minimum allowed inward movement. This is accomplished by setting $\alpha_{il}^{j,p}=\alpha_{max}$, where $\alpha_{max}$ is a large inward movement, say 10.

$\alpha_{il}^{j,p}<0$ and $0<\beta_{il}^{j,p}<1$, $\alpha_{il}^{j,p}$ represents a feasible maximum movement for the line segment between $r_i^P$ and $r_k^P$. However, since it is an outward movement, it shall be set to zero since the algorithm is designed for inward movement.

In case both $\alpha_{ik}^{j,p}$ and $\alpha_{il}^{j,p}$ are feasible maximum movements, the smallest one is chosen. The considered cases can be summed as follows:

$$\alpha_i^{j,p} = \begin{cases} \alpha_{max}, & \alpha_{ik}^{j,p}<0, \ \alpha_{il}^{j,p}>0, \ \beta_{ik}^{j,p}\notin[0,1], \ \beta_{il}^{j,p}\notin[0,1] \\ \alpha_{il}^{j,p} & \alpha_{ik}^{j,p}<0, \ \alpha_{il}^{j,p}>0, \ \beta_{ik}^{j,p}\notin[0,1], \ \beta_{il}^{j,p}\in[0,1] \\ \alpha_{max} & \alpha_{ik}^{j,p}<0, \ \alpha_{il}^{j,p}>0, \ \beta_{ik}^{j,p}\in[0,1], \ \beta_{il}^{j,p}\notin[0,1] \\ \alpha_{il}^{j,p} & \alpha_{ik}^{j,p}<0, \ \alpha_{il}^{j,p}>0, \ \beta_{ik}^{j,p}\in[0,1], \ \beta_{il}^{j,p}\in[0,1] \\ \alpha_{max} & \alpha_{ik}^{j,p}>0, \ \alpha_{il}^{j,p}<0, \ \beta_{ik}^{j,p}\notin[0,1], \ \beta_{il}^{j,p}\notin[0,1] \\ \alpha_{max} & \alpha_{ik}^{j,p}>0, \ \alpha_{il}^{j,p}<0, \ \beta_{ik}^{j,p}\notin[0,1], \ \beta_{il}^{j,p}\in[0,1] \\ \alpha_{ik}^{j,p} & \alpha_{ik}^{j,p}>0, \ \alpha_{il}^{j,p}<0, \ \beta_{ik}^{j,p}\in[0,1], \ \beta_{il}^{j,p}\notin[0,1] \\ \alpha_{ik}^{j,p} & \alpha_{ik}^{j,p}>0, \ \alpha_{il}^{j,p}<0, \ \beta_{ik}^{j,p}\in[0,1], \ \beta_{il}^{j,p}\in[0,1] \\ \alpha_{max} & \alpha_{ik}^{j,p}>0, \ \alpha_{il}^{j,p}>0, \ \beta_{ik}^{j,p}\notin[0,1], \ \beta_{il}^{j,p}\notin[0,1] \\ \alpha_{il}^{j,p} & \alpha_{ik}^{j,p}>0, \ \alpha_{il}^{j,p}>0, \ \beta_{ik}^{j,p}\notin[0,1], \ \beta_{il}^{j,p}\in[0,1] \\ \alpha_{ik}^{j,p} & \alpha_{ik}^{j,p}>0, \ \alpha_{il}^{j,p}>0, \ \beta_{ik}^{j,p}\in[0,1], \ \beta_{il}^{j,p}\notin[0,1] \\ \min(\alpha_{ik}^{j,p},\alpha_{il}^{j,p}) & \alpha_{ik}^{j,p}>0, \ \alpha_{il}^{j,p}>0. \ \beta_{ik}^{j,p}\in[0,1], \ \beta_{il}^{j,p}\in[0,1] \\ 0 & \text{otherwise} \end{cases} \quad (21)$$

Note that some of the listed cases may never occur. This is of less consequence in case the computations are implemented in a consecutive way, following the order of presentation of this document.

Movement with Respect to Polygon Line Segments

The intersection between the line of movement as given by (12), and the line segment between $r_m^P$ and $r_n^P$, is given by the solution to the following system of equations, which is solved with respect to the parameters $\alpha_{i,mn}^P$ and $\gamma_{mn}^P$, where the subscript refer to the points involved in the computation $$r_i^P + \alpha_{i,mn}^P(r_{CG} - r_i^P) = r_m^P + \gamma_{mn}^P(r_n^P - r_m^P) \quad (22)$$

$$\Leftrightarrow ((r_{CG} - r_i^P) - (r_n^P - r_m^P))\begin{pmatrix}\alpha_{i,mn}^P \\ \gamma_{mn}^P\end{pmatrix} = r_m^P - r_i^P.$$

The solution shall not be computed for the points adjacent to $r_i^P$. Furthermore, the intersection between the two lines fall outside the relevant line segment between $r_m^P$ and $r_n^P$ in case $\gamma_{mn}^P\notin[0,1]$. If this is the case the intersection shall be disregarded in the evaluation of the corner $r_i^P$. The requirement that $\alpha_{i,mn}^P>0$ also remains. Note also that it is only needed to solve (22) once for each corner point and iteration step of the algorithm.

To obtain the complete picture, (22) is first solved for all line segments, excluding the ones that are adjacent to $r_i^P$. The solution with the minimum value of $\alpha_{i,mn}^P$, such that $\alpha_{i,mn}^P>0$ and $\gamma_{mn}^P\in[0,1]$, is expressed as (note that since the movement is inward such a solution always exists)

$$\alpha_{i,m_0n_0}^P,\gamma_{m_0n_0}^P \quad (23)$$

Combination

Since all high-precision measurement points are evaluated along the same direction as far as constraints are concerned, they can be directly combined. Note also that since one point is to be removed from the interior of the polygon for each iteration step, the limiting high-precision measurement point is to be selected as the second one that becomes active. The high-precision measurement point that becomes an active constraint is hence given by (24), where (24) can be calculated as follows $$j_{first} = \mathop{\mathrm{argmin}}_{\substack{j \\ r_j^{m,p}\in P^P}} \alpha_i^{j,p} \quad (24)$$

$$j_{activeConstraint} = \mathop{\mathrm{argmin}}_{\substack{j\neq j_{first} \\ r_j^{m,p}\in P^P}} \alpha_i^{j,p},$$

The corresponding movement becomes $$\alpha_i^{P,measurementConstraints} = \alpha_i^{j_{activeConstraint},P}. \quad (25)$$

The result (25) is finally combined with the constraint imposed by the possibility of self-intersection $$\alpha_i^{P,allConstraints} = \min(\alpha_i^{P,measurementConstraints}, \alpha_{i,m_0n_0}^P) - \in, \quad (26)$$

where $\in$ is a small number that prevents that the constraint becomes exactly active, so that the search is started outside the constraining point in the next iteration step.

Obtained Polygon Area Reduction

Figure 9:
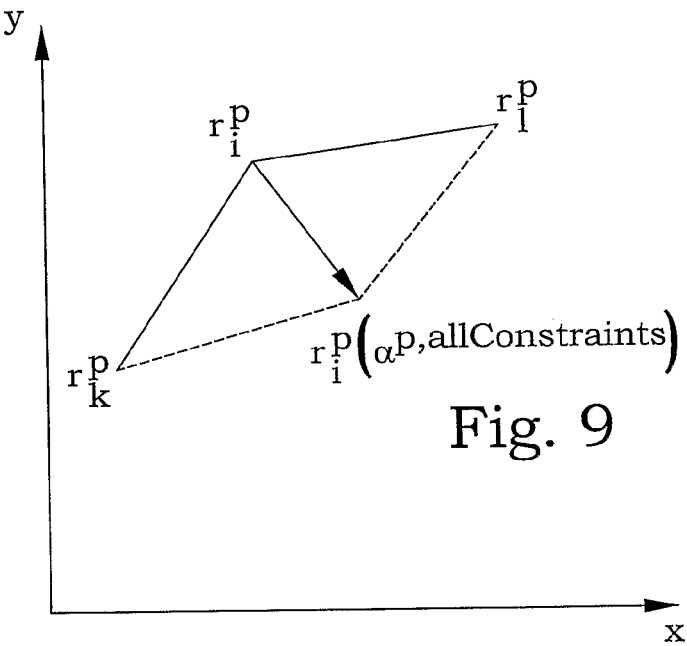
FIG. 9 is an illustration of the geometry for calculation of the area reduction.

The obtained are reduction follows by integration, or equivalently, computation of the areas under the parts of the polygon shown in FIG. 9.

By consideration of the facts that the area under the curve can be computed as sums of areas of rectangles and triangles, it is only the areas related to the moving and adjacent points that are affected by the movement, it follows that the areas before and after movement can be expressed as:

$$A_{i,before}^P = A_0 + \frac{1}{2}(x_i^P - x_k^P)(y_k^P + y_i^P) + \frac{1}{2}(x_l^P - x_i^P)(y_i^P + y_l^P) \quad (27)$$

$$A_{i,after}^P = A_0 + \frac{1}{2}\left(x_i^P(\alpha_i^{P,allConstraints}) - x_k^P\right)\left(y_k^P + y_i^P(\alpha_i^{P,allConstraints})\right) + \quad (28)$$
$$\frac{1}{2}\left(x_l^P - x_i^P(\alpha_i^{P,allConstraints})\right)\left(y_i^P(\alpha_i^{P,allConstraints}) + y_l^P\right).$$

The reduction of area obtained is hence given by $$\Delta A_i^{P,allConstraints} = \left|\frac{1}{2}(x_i^P - x_k^P)(y_k^P + y_i^P) + \frac{1}{2}(x_l^P - x_i^P)(y_i^P + y_l^P) - \quad (29)\right.$$

-continued $$\frac{1}{2}\left(x_i^p\left(\alpha_i^{p,allConstraints}\right) - x_k^p\right)\left(y_k^p + y_i^p\left(\alpha_i^{p,allConstraints}\right)\right) -$$

$$\frac{1}{2}\left(x_l^p - x_i^p\left(\alpha_i^{p,allConstraints}\right)\right)\left(y_i^p\left(\alpha_i^{p,allConstraints}\right) + y_l^p\right)\Big|.$$

The maximum of this area reduction measure determines which of the $N_p$ corners to move at a specific iteration, whereas (12) and (26) determine the movement.

The Algorithm

In the algorithm below $N_p^{m,rem}$ denotes the number of high-precision measurement points that remain in the interior of the polygon, at each corner movement iteration step. The algorithm for polygon computation, for one specific quantised path loss measurement index vector p is then:

Initialization:
  Compute the centre of gravity of all high-precision measurements of the cluster (6).
  Compute the maximum distance r from the centre of gravity (7), (8).
  Compute the initial polygon distributed around the circle R (9), (10), (11).

Area Minimization:
  Repeat until $N_p^{m,rem} < C^p N_p^m$ or $\alpha_i^{p,allConstraints} \leq 0$ (Measurement removal loop).
    Compute the centre of gravity for the points that remain in the interior of the polygon (6).
    For i=1 to $N_p$ (Corner movement evaluation loop).
      For j=1 to $N_p^{m,rem}$ (Measurement point constraint evaluation loop).
        Compute and store allowed, point-wise constrained, corner movement (21).
      End (Measurement point constraint evaluation loop).
      Compute and store allowed combined, measurement constrained, movement (24), (25).
      Compute and store allowed, self-intersection constrained, movement (23).
      Compute and store combined allowed, measurement and self-intersection constrained, movement (26).
      Compute and store area reduction (29), corresponding to (26).
    End (Corner movement evaluation loop).
    Find the corner with index $i_0$ corresponding to the maximum area reduction.
    Update (12) the corner $i_0$ with the movement $\alpha_{i_0}^{p,allConstraints}$.
    Remove the high-precision measurement point that is no longer in the interior of the polygon, from any lists of interior points. $N_p^{m,rem} := N_p^{m,rem} - 1$.
  End (Measurement removal loop).
  Transform the final corner points of the polygon to WGS 84c latitudes and longitudes.

Numerical Example

Figure 10:
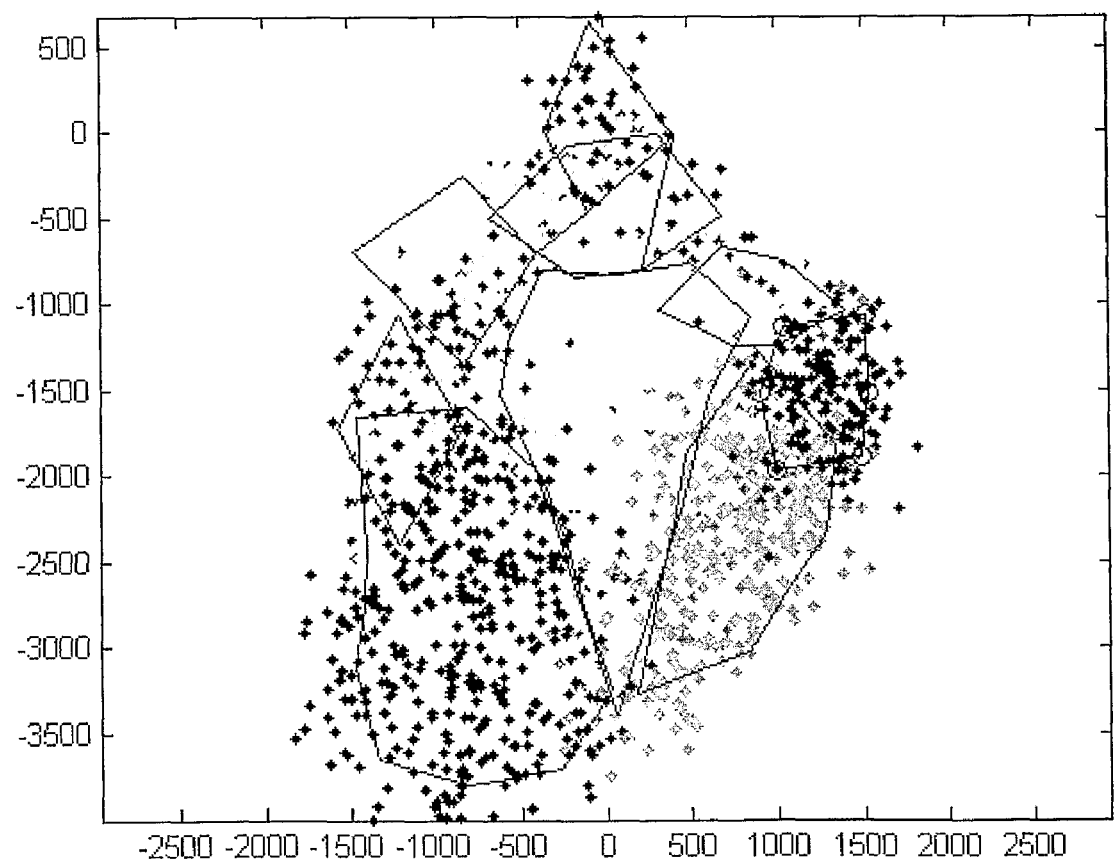
FIG. 10 is an illustration of an initiation of a numerical example of polygon computation.

The example in FIG. 10 illustrates the generation of polygons dividing one cell into smaller areas and using path loss measurements from six neighbour RBSs. The measurements are quantised into two intervals, one below 135 dB (for small pathloss, index 1) and one above 135 dB (for high path loss, index 2). In total this results in 64 different combinations of quantised path losses. However, only a few of these fall within the cell that is proceeded. High precision measurements are then generated by a random procedure. These measurements are shown as diamonds in FIG. 10. The corresponding path loss measurements were corrupted with 1 dB AWGN in order to simulate the effect of fading to some extent. This explains why the colour coded areas of FIG. 10 are not distinct.

The invention claimed is:

1. A computer-implemented method for providing position determination assisting data in a cellular communications network, comprising the steps of:
   establishing a quantised path loss measurement index vector for a user equipment;
   said quantised path loss measurement index vector comprising at least quantised radio measurements, said quantised radio measurements being selected from a list of quantised path loss measurements, quantised signal strength measurements, quantised signal-to-interference ratios, or relative versions thereof, in which signals to/from said user equipment fulfill at least a specific radio condition criterion when received;
   performing a high-precision position determination for said user equipment;
   repeating said establishing and performing steps a plurality of times;
   clustering results of said high-precision position determinations belonging to the same quantised path loss measurement index vector in separate clustered results;
   associating an area definition with at least one of said clustered results; and,
   creating position determination assisting data comprising a relation between said quantised path loss measurement index vector and said associated area definitions.

2. The method according to claim 1, wherein said associated area contains a predetermined percentage of said clustered results.

3. The method according to claim 2, wherein an area measure of said associated area definition is minimized.

4. The method according to claim 3, wherein said associated area definition is a polygon.

5. The method according to claim 1, wherein said associated area definition is a polygon.

6. The method according to claim 5, wherein said associating step in turn comprises the steps of:
   encompassing at least one of said clustered results of said high-precision position determinations, belonging to one quantised path loss measurement index vector by a polygon;
   altering the position of corners of said polygon along predetermined paths to improve a predetermined criterion while maintaining at least a predetermined percentage of said high-precision position determinations of the cluster within the polygon.

7. The method according to claim 6, wherein said improvement is an optimization of the present altering step.

8. The method according to claim 6, wherein said step of altering is repeated until another altering step would invalidate said predetermined percentage of high-precision position determinations of the clustered results within the polygon.

9. The method according to claim 6, wherein said predetermined criterion is an as large area reduction of said polygon as possible.

10. The method according to claim 6, wherein said predetermined criterion is an as large distance reduction as possible between the centre of gravity of all high-precision position determinations within the area and said altered corner.

11. The method according to claim 6, wherein said predetermined path is a curve through the original corner position and a centre of gravity for said high-precision position determinations of the clustered results within the polygon.

12. The method according to claim 11, wherein said curve is a straight line through the original corner position and a centre of gravity for said high-precision position determinations of the clustered results within the polygon.

13. The method according to claim 6, wherein said altering step comprises altering of one corner position at a time, allowing one of said high-precision position determinations of said clustered results to be placed outside said polygon, but not two of said high-precision position determinations.

14. The method according to claim 6, wherein more than one of said high-precision position determinations of said clustered results are allowed to be placed outside said polygon at least one of said altering steps.

15. The method according to claim 13, wherein said altering alters one corner position at a time and brings one of said high-precision measurements of said clustered results to be placed on a linear segment between the corner that is altered and a neighbouring corner.

16. The method according to claim 6, wherein, in said altering step, the position of said corners of said polygon is tentatively altered along more than one predetermined path and said predetermined path being selected as the path giving the best results according to said predetermined criterion.

17. The method according to claim 1, wherein, in said clustering step, said results of said high-precision position determinations to be clustered are selected according to a further criterion.

18. The method according to claim 17, wherein said further criterion is based on at least one of auxiliary information about circumstances of signalling and auxiliary measurements of signalling properties.

19. The method according to claim 18, further comprising the step of recording a measuring instant of said high-precision position determinations, wherein said further criterion is based on at least said measuring instant.

20. The method according to claim 19, wherein only results of said high-precision position determinations younger than a predetermined age are clustered.

21. The method according to claim 19, wherein only results of said high-precision position determinations being measured during one or several predetermined time periods of a day, week or year are clustered.

22. The method according to claim 18, further comprising the step of recording a type of radio access bearer used during said high-precision position determinations, whereby said further criterion is based on at least said type of radio access bearer.

23. The method according to claim 18, further comprising the step of recording a round trip time for a radio signal with respect to a particular base station, wherein said further criterion is based on at least said round trip time.

24. The method according to claim 1, wherein said clustering, associating and creating steps are performed continuously or intermittently.

25. The method according to claim 24, wherein said clustering, associating and creating steps are performed for at least one of possible quantised path loss measurement index vector.

26. The method according to claim 25, further comprising the step of storing the last achieved position determination assisting data at a computer readable medium.

27. The method according to claim 1, wherein said clustering, associating and creating steps are performed when a position determination is requested.

28. A method for radio network planning, comprising the steps of:
obtaining position determination assisting data provided according to claim 1;
said step of performing a high-precision position determination being performed on demand; and evaluating said position determination assisting data regarding actual radio propagation.

29. A method for determining a position of a user equipment in a cellular communications network, comprising the steps of:
obtaining position determination assisting data provided according to claim 1;
establishing a quantised path loss measurement index vector for said user equipment;
said quantised path loss measurement index vector comprising at least quantised radio measurements, said quantised radio measurements being selected from a list of quantised path loss measurements, quantised signal strength measurements, quantised signal-to-interference ratio, or relative versions thereof; and
determining, by said position determination assisting data, an area definition related to said quantised path loss measurement index vector as defining an area in which said user equipment is positioned.

30. The method according to claim 29, further comprising the step of providing at least one of auxiliary information about circumstances of signalling and auxiliary measurements of signalling properties; wherein said step of determining an area definition is based also on said at least one of auxiliary information about circumstances of signalling and auxiliary measurements of signalling properties.

31. The method according to claim 29, wherein said area definition is a polygon.

32. A method for determining a position of a user equipment in a cellular communications network, comprising the steps of:
determining an initial position of said user equipment according to claim 29; and
refining said initial position by a refined positioning method.

33. The method according to claim 32, wherein said refined positioning method is based on Uplink Time Difference of Arrival (UTDOA) measurements.

34. The method according to claim 32, wherein said refined positioning method is based on Round Trip Time (RTT) measurements.

35. The method according to claim 32, wherein said refined positioning method is based on assisted Global Positioning System (GPS).

36. An arrangement for providing position determination assisting data in a cellular communications network, comprising:
means for establishing a quantised path loss measurement index vector for a user equipment;
said quantised path loss measurement index vector comprising at least quantised radio measurements, said quantised radio measurements being selected from a list of quantised radio measurements, quantised signal strength measurements, quantised signal-to-interference ratio, or relative versions thereof;
means for performing a high-precision position determination for said user equipment;
means for clustering results of said high-precision position determinations belonging to the same quantised path loss measurement index vector in separate clustered results; and
means for associating an area definition with at least one of said clustered results and creating position determination assisting data comprising a relation between said quantised path loss measurement index vector and said associated area definitions.

37. An arrangement for determining a position of a user equipment in a cellular communications network, comprising:
arrangement for obtaining position determination assisting data according to claim 36;
means for establishing a quantised path loss measurement index vector for said user equipment;
said quantised path loss measurement index vector comprising at least quantised radio measurements, said quantised radio measurements being selected from a list of quantised radio measurements, quantised signal strength measurements, quantised signal-to-interference ratio, or relative versions thereof; and
means for determining, by said position determination assisting data, an area definition related to said quantised radio measurements, quantised signal strength measurements, quantised signal-to-interference ratio as defining an area in which said user equipment is positioned.

38. The arrangement according to claim 37, further comprising: means for refining said area in which said user equipment is positioned by a refined positioning method.

39. The arrangement according to claim 38, wherein said means for refining comprises means for performing a Uplink Time Difference of Arrival (UTDOA) positioning.

40. The arrangement according to claim 38, wherein said means for refining comprises means for performing a Round Trip Time (RTT) positioning.

41. The arrangement according to claim 38, wherein said means for refining comprises assisted Global Positioning System (GPS) means.

42. A node of a cellular communications network, comprising an arrangement according to claim 37.

43. The node according to claim 42, being a node selected from the list of:
base station;
base station controller;
radio network controller;
service mobile location centre; and
stand alone service mobile location centre.

44. A cellular communications network, comprising an arrangement according to claim 37.

* * * * *

UNITED STATES PATENT AND TRADEMARK OFFICE
CERTIFICATE OF CORRECTION

PATENT NO. : 8,175,061 B2
APPLICATION NO. : 12/162241
DATED : May 8, 2012
INVENTOR(S) : Wigren It is certified that error appears in the above-identified patent and that said Letters Patent is hereby corrected as shown below:

In Column 16, Line 52, delete "superscript$^{rem}$"" and insert -- superscript $^{rem}$ --, therefor.

In Column 18, Lines 21-22, in Equation (13), delete " $\dfrac{-(x_i^P - x_k^P)(y_j^{m,P} - y_i^P) + (x_j^{m,P} - x_k^P)(y_k^P - y_i^P)}{(x_{CG} - x_i^P)(y_j^{m,P} - y_k^P) - (x_j^{m,P} - x_k^P)(y_{CG} - y_i^P)}$ and insert -- $\dfrac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)}$ --, therefor.

In Column 18, Lines 25-26, in Equation (14), delete " $\dfrac{-(x_i^P - x_k^P)(y_j^{m,P} - y_k^P) + (x_j^{m,P} - x_k^P)(y_k^P - y_i^P)}{(x_{CG} - x_i^P)(y_j^{m,P} - y_k^P) - (x_j^{m,P} - x_k^P)(y_{CG} - y_i^P)}$ " and insert -- $\dfrac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)}$ --, therefor.

In Column 18, Lines 55-56, in Equation (20), delete " $\beta_{il}^{j,p} = \dfrac{x_j^{m,p} - x_i^p(\alpha_{ik}^{j,p})}{x_l^p - x_i^p(\alpha_{il}^{j,p})}$ " and insert -- $\beta_{il}^{j,p} = \dfrac{x_j^{m,p} - x_i^p(\alpha_{ii}^{j,p})}{x_l^p - x_i^p(\alpha_{il}^{j,p})}$ --, therefor.

In Column 19, Line 31, in Equation (21), delete " $\alpha_{il}^{j,p} < 0,$ " and insert -- $\alpha_{ik}^{j,p}$ --, therefor.

In Column 19, Line 40, in Equation (21), delete " $\beta_{il}^{j,p} \in$ " and insert -- $\beta_{il}^{j,p} \notin$ --, therefor.

Signed and Sealed this
Ninth Day of October, 2012

David J. Kappos
*Director of the United States Patent and Trademark Office*

CERTIFICATE OF CORRECTION (continued)
U.S. Pat. No. 8,175,061 B2

In Column 20, Line 29, in Equation (24), delete "$j \neq j_{firts}$" and insert -- $j \neq j_{first}$ --, therefor.

In Column 20, Line 55, in Equation (27), delete " $A_0 + \frac{1}{2}(x_j^p - x_k^p)(y_k^p + y_j^p) + \frac{1}{2}(x_j^p - x_i^p)(y_i^p + y_j^p)$ ," and insert -- $A_0 + \frac{1}{2}(x_j^p - x_k^p)(y_k^p + y_j^p) + \frac{1}{2}(x_j^p - x_i^p)(y_i^p + y_j^p)$ --, therefor.